US011580148B2

(12) United States Patent
Chen et al.

(10) Patent No.: US 11,580,148 B2
(45) Date of Patent: Feb. 14, 2023

(54) DOCUMENT STORAGE AND MANAGEMENT

(71) Applicant: Citrix Systems, Inc., Fort Lauderdale, FL (US)

(72) Inventors: Yongyu Chen, Nanjing (CN); Lei Xu, Nanjing (CN); Wei Long, Nanjing (CN); Liang Bao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/733,420

(22) Filed: Jan. 3, 2020

(65) Prior Publication Data
US 2021/0157830 A1 May 27, 2021

Related U.S. Application Data

(63) Continuation of application No. PCT/CN2019/120900, filed on Nov. 26, 2019.

(51) Int. Cl.
*G06F 16/35* (2019.01)
*G06F 3/06* (2006.01)

(52) U.S. Cl.
CPC ............ *G06F 16/355* (2019.01); *G06F 3/064* (2013.01); *G06F 3/0608* (2013.01); *G06F 3/0656* (2013.01); *G06F 3/0683* (2013.01)

(58) Field of Classification Search
CPC ...... G06F 16/355; G06F 3/0608; G06F 3/064; G06F 3/0656; G06F 3/0683

(Continued)

(56) References Cited

U.S. PATENT DOCUMENTS 8,359,334 B2 1/2013 Hitz et al.
8,539,008 B2 * 9/2013 Faith ...................... G06F 16/13
707/822

(Continued)

FOREIGN PATENT DOCUMENTS

CN 103812939 A 5/2014
CN 106020714 A 10/2016

(Continued)

OTHER PUBLICATIONS

Australian Examination Report No. 1 dated Oct. 28, 2020 for Australian Application No. 2019438434; 6 pages.

(Continued)

*Primary Examiner* — Hosain T Alam
*Assistant Examiner* — Nicholas E Allen

(57) ABSTRACT

Techniques are disclosed for content storage in a way that facilitates consistent and concurrent read/write processing of stored documents. An example methodology implementing the techniques includes segmenting the contents of a document into a plurality of content segments and storing the plurality of content segments within a data structure, the data structure including storage blocks having storage portions and buffer portions. The storage of the plurality of content segments includes storage of content segments within a storage portions of the storage blocks of the data structure. The method also includes receiving at least one change to the content and utilizing a buffer portion of at least one storage block to store the at least one change to the content.

20 Claims, 18 Drawing Sheets

(58) Field of Classification Search
USPC .......................................................... 707/693
See application file for complete search history.

(56) References Cited

U.S. PATENT DOCUMENTS

| | | | |
|---|---|---|---|
| 9,760,444 B2 | 9/2017 | Varadharajan et al. | |
| 10,372,685 B2 | 8/2019 | Vincent et al. | |
| 10,423,535 B2 | 9/2019 | Chahal | |
| 2004/0174276 A1* | 9/2004 | McCanne | H03M 7/30 341/50 |
| 2010/0198730 A1* | 8/2010 | Ahmed | G06F 21/6209 705/50 |
| 2010/0235569 A1* | 9/2010 | Nishimoto | G06F 3/064 711/103 |
| 2010/0332401 A1* | 12/2010 | Prahlad | H04L 63/0428 705/80 |
| 2012/0310890 A1* | 12/2012 | Dodd | G06F 16/113 707/646 |
| 2014/0358871 A1* | 12/2014 | Cideciyan | G06F 16/1748 707/692 |
| 2015/0199241 A1* | 7/2015 | Zhuang | G06F 16/178 707/692 |
| 2016/0055169 A1 | 2/2016 | Sibbald | |
| 2016/0092464 A1* | 3/2016 | Hildebrand | G06F 16/1805 707/648 |
| 2016/0179919 A1* | 6/2016 | Martin | G06F 16/242 707/602 |
| 2016/0292048 A1* | 10/2016 | Dolan | G06F 3/0608 |
| 2016/0378820 A1* | 12/2016 | Marcotte | G06F 16/183 707/703 |
| 2017/0031937 A1 | 2/2017 | Bowman et al. | |
| 2017/0060683 A1* | 3/2017 | Luby | G06F 3/067 |
| 2017/0083416 A1* | 3/2017 | Richardson | G06F 11/2094 |
| 2017/0171360 A1* | 6/2017 | Phillips | H04L 65/604 |
| 2017/0235781 A1* | 8/2017 | Kang | G06F 16/2358 707/625 |
| 2017/0364701 A1* | 12/2017 | Struttmann | G06F 16/2282 |
| 2018/0143975 A1* | 5/2018 | Casal | G06F 40/58 |
| 2018/0205552 A1* | 7/2018 | Struttmann | G06F 16/9024 |
| 2018/0276083 A1* | 9/2018 | Mitkar | G06F 3/064 |
| 2019/0236102 A1* | 8/2019 | Wade | G06F 16/901 |
| 2019/0251028 A1 | 8/2019 | Cheng et al. | |
| 2019/0310977 A1* | 10/2019 | Pal | G06F 16/2228 |
| 2019/0318117 A1* | 10/2019 | Beecham | G06F 16/9024 |
| 2019/0340379 A1* | 11/2019 | Beecham | G06F 16/9014 |
| 2020/0024475 A1* | 1/2020 | Samantara | C09D 5/00 |
| 2021/0157830 A1 | 5/2021 | Chen | |

FOREIGN PATENT DOCUMENTS

| | | |
|---|---|---|
| CN | 106095765 A | 11/2016 |
| CN | 106850856 A | 6/2017 |
| CN | 107562649 A | 1/2018 |

OTHER PUBLICATIONS

PCT International Search Report and Written Opinion dated Sep. 2, 2020 for International Application No. PCT/CN2019/120900; 8 Pages.
Canadian Office Action dated Dec. 18, 2020 for Canadian Application No. 3,093,681; 5 pages.
Chinese Office Action (including English translation) issued in App. No. CN201980031447.6, dated Mar. 7, 2022, 15 pages.
Canadian Office Action dated May 26, 2021, issued in CA3093681, 3 pages.
Australian Examination Report No. 2 dated Apr. 8, 2021, issued in AU2019438434, 4 pages.
Australian Examination Report No. 3 dated Sep. 3, 2021, issued in AU2019438434, 5 pages.

* cited by examiner

DOCUMENT STORAGE AND MANAGEMENT

CROSS REFERENCE TO RELATED APPLICATIONS

This application is a continuation of and claims the benefit of PCT Patent Application No. PCT/CN2019/120900 filed on Nov. 26, 2019 in the English language in the State Intellectual Property Office and designating the United States, the contents of which are hereby incorporated herein by reference in its entirety.

BACKGROUND

Databases capable of storing large documents are becoming more and more prevalent. These databases generally store data in data containers made up of records, where the data within each record is organized into one or more fields. For example, in the case of relational databases, the data containers are typically referred to as tables, the records are referred to as rows, and the fields are referred to as columns. In the case of object databases, the data containers are typically referred to as object classes, the records are referred to as objects, and the fields are referred to as attributes. Other database models may use other terminology. In any case, database records provide a practical mechanism for storing and retrieving data from a database.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include, by a computing device, segmenting content of a document into a plurality of content segments and storing the plurality of content segments within a data structure, the data structure including storage blocks having storage portions and buffer portions, and the storage of the plurality of content segments including storage of content segments within a storage portion of the storage blocks of the data structure. The method may also include receiving at least one change to the content and utilizing a buffer portion of at least one storage block to store the at least one change to the content.

In one aspect, the storage block is a first storage block, and the method may also include receiving a second change to the content and utilizing the buffer portion of the first storage block and a buffer portion of a second neighboring storage block of the data structure to store the second change to the content.

In one aspect, the method may also include adjusting the buffer portion in the first storage block and the buffer portion in the second, neighboring storage block of the data structure to be the same size.

In one aspect, the storage block is a first storage block, and the method may also include receiving a second change to the content and generating a new storage block in the data structure, the new storage block including a storage portion and a buffer portion, the new storage block neighboring the first storage block. The method may further include utilizing the buffer portion of the first storage block and the storage portion and the buffer portion of the new storage block of the data structure to store the second change to the content.

In one aspect, the method may also include adjusting the buffer portion in the first storage block and the buffer portion in the new storage block of the data structure to be the same size.

In one aspect, the buffer portion is at least 20% of the storage block.

In one aspect, the at least one change to the content comprises deleting content from a content segment of the plurality of content segments stored in a content portion of at least one storage block such that a buffer portion of the at least one storage block is increased in size.

According to another illustrative embodiment provided to illustrate the broader concepts described herein, a system includes a memory and one or more processors in communication with the memory. The processor may be configured to segment content of a document into a plurality of content segments and store the plurality of content segments within a data structure, the data structure including storage blocks having storage portions and buffer portions, and the storage of the plurality of content segments including storage of content segments within a storage portion of the storage blocks of the data structure. The processor may be also configured to, responsive to at least one change to the content of the document, store the at least one change to the content utilizing a buffer portion of at least one storage block.

In one aspect, the storage block is a first storage block, and the processor may be further configured to, responsive to a second change to the content of the document, store the second change to the content utilizing the buffer portion of the first storage block and a buffer portion of a second neighboring storage block of the data structure.

In one aspect, the processor may be further configured to adjust the buffer portion in the first storage block and the buffer portion in the second, neighboring storage block of the data structure to be the same size.

In one aspect, the storage block is a first storage block, and the processor may be further configured to, responsive to a second change to the content of the document, generate a new storage block in the data structure, the new storage block including a storage portion and a buffer portion, the new storage block neighboring the first storage block, and store the second change to the content utilizing the buffer portion of the first storage block and the storage portion and the buffer portion of the new storage block of the data structure.

In one aspect, the processor may be further configured to adjust the buffer portion in the first storage block and the buffer portion in the new storage block of the data structure to be of substantially the same size.

In one aspect, the at least one change to the content comprises a deletion of content, and the processor may be further configured to delete content from a content segment of the plurality of content segments stored in a content portion of at least one storage block such that a buffer portion of the at least one storage block is increased in size.

According to another illustrative embodiment provided to illustrate the broader concepts described herein, non-transitory machine-readable medium may encode instructions that when executed by one or more processors cause a process to be carried out. The process may include segmenting content of a document into a plurality of content segments and storing the plurality of content segments within a data structure, the data structure including storage blocks having storage portions and buffer portions, and the storage of the plurality of content segments including storage of content segments within a storage portion of the storage blocks of the data structure. The process may also include, responsive to at least one change to the content, utilizing a buffer portion of at least one storage block to accommodate the at least one change to the content In one aspect, the storage block is a first storage block, and the process may also include, responsive to a second change to the content, utilizing the buffer portion of the first storage block and a buffer portion of a second neighboring storage block of the data structure to accommodate the second change to the content.

In one aspect, the process may also include adjusting the buffer portion in the first storage block and the buffer portion in the second, neighboring storage block of the data structure to be the same size.

In one aspect, the storage block is a first storage block, and the process may also include, responsive to a second change to the content, generating a new storage block in the data structure, the new storage block including a storage portion and a buffer portion, the new storage block neighboring the first storage block. The process may further include utilizing the buffer portion of the first storage block and the storage portion and the buffer portion of the new storage block of the data structure to accommodate the second change to the content.

In one aspect, the process may also include adjusting the buffer portion in the first storage block and the buffer portion in the new storage block of the data structure to be the same size.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
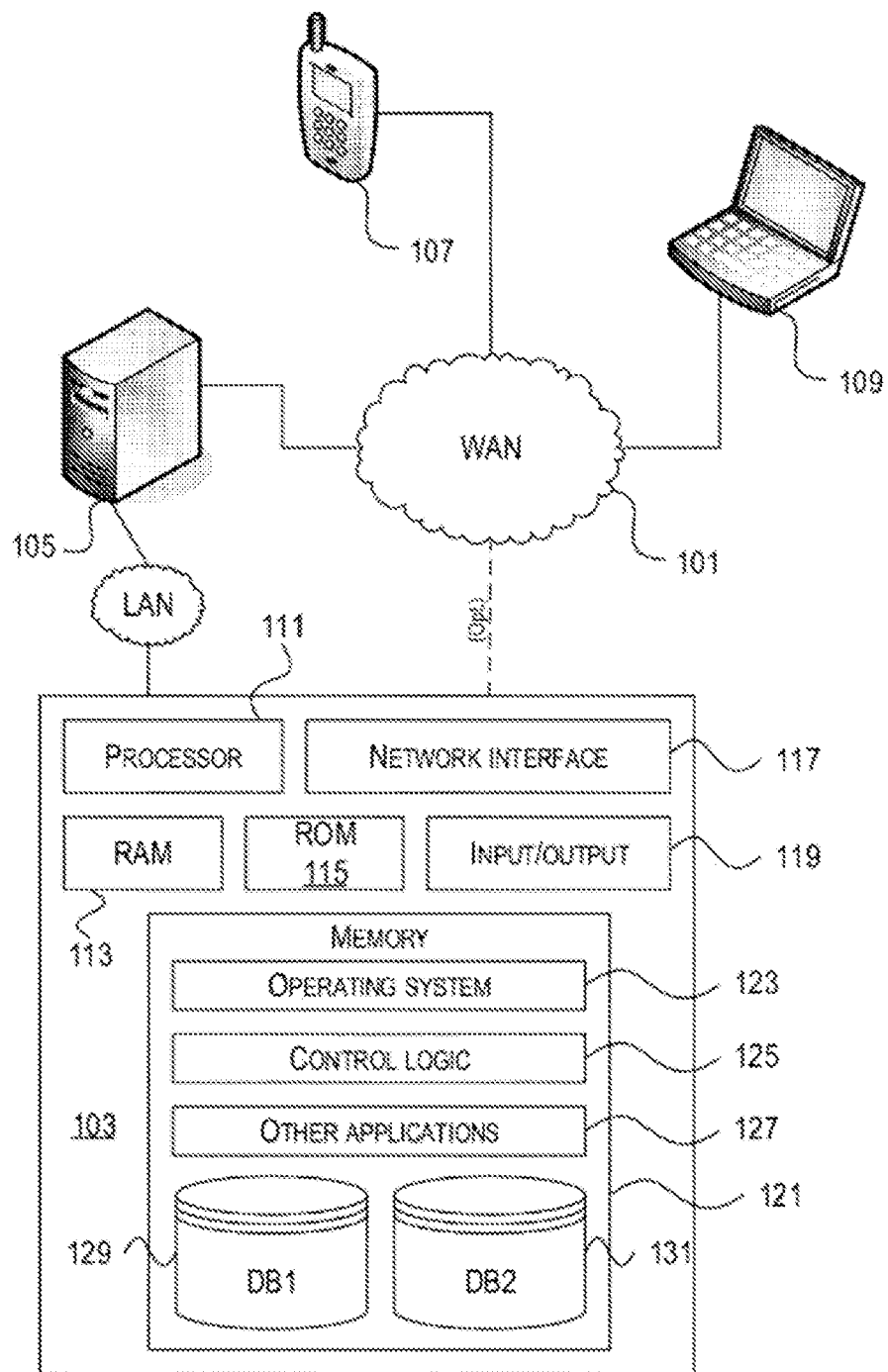
FIG. 1 depicts an illustrative computer system architecture that may be used in accordance with one or more illustrative aspects of the concepts described herein.

In accordance with certain of the embodiments disclosed herein, content storage and management techniques enable storage of documents in a way that facilitates consistent and concurrent read/write processing of the stored documents. In an embodiment, the content storage and management capabilities may be implemented and provided by a database service, such as a document-oriented database service. In such embodiments, the database service can store a document by dividing the content of the document into distinct content segments and storing the content segments in corresponding storage blocks having storage portions and buffer portions. Dividing the content into segments and storing the content segments in respective storage portions of corresponding storage blocks allow for storage of large documents in that the document size is not limited to or otherwise restricted by the size or storage capacity of a single storage block.

In embodiments, upon receiving a document to be stored, the database service can divide the content of the document into distinct segments and store the content segments in the storage portions of corresponding storage blocks such that the buffer portions of the storage blocks are maintained (i.e., not used) in storing the content segments. Then, when a change to the stored content is made, such as additional content being added to the document, the database service can identify the changed content segment, and accommodate the change to the content using the buffer portion in the storage block storing the identified content segment. In cases where the buffer portion is insufficient to accommodate the change, the database service can accommodate the change to the content by also making use of a buffer portion in a second (or neighboring) storage block. As will be described in detail herein below, the neighboring storage block may be an existing storage block or a newly generated storage block. In any case, since the buffer portion in a storage block provides extra storage capacity, the change to the stored content can typically be accommodated (or realized) by modifying one or two storage blocks.

This approach is in contrast with approaches taken in conventional database and/or file services or systems that do not utilize storage blocks having buffer portions. Moreover, such databases have limitations with respect to the size of a document that can be stored. Also, since the database records are typically of a fixed size, adding data at a granular level (e.g., into a database record) is not a trivial process. In such conventional services or systems, since the storage blocks do not have extra capacity in the form of buffers, a large number of storage blocks and, in some cases all the storage blocks, used to store the document content are modified to accommodate (or realize) a change to the content. These and other advantages, configurations, modifications, and embodiments will be apparent in light of this disclosure.

In addition to its ordinary meaning, as used herein, the term "digital content" refers broadly to information intended for consumption by a user, such as when the content is displayed using a display device, played using a playback device, or otherwise rendered. Examples of digital content include photographs, social networking postings, documents, sound recordings, audiovisual recordings, and any other type of digital information. The term digital content may also include information that is not specifically intended it be rendered, and therefore also encompasses embedded metadata that defines various aspects of the content. Digital content is encoded in binary digits (for example, zeroes and ones) that are stored in an electronic container often referred to as a "file" or "document". A single file or document may include multiple distinct digital content items. A file or document can take the form of a physical object, such as a non-transitory computer readable medium on which the digital content is recorded. In the context of applications involving digital computers, the terms "content" and "digital content" are often used interchangeably.

In addition to its ordinary meaning, as used herein, the term "data structure" refers broadly to a way organizing data for storage in a computer accessible storage device (e.g. a memory) so the data can be accessed or otherwise used by an application or software module. In its simplest form, a data structure can be, for example, a set of one or more memory or storage locations. As will be appreciated, a data structure may have stored therein data of interest or a pointer that refers to a memory location where data of interest can be found. A data structure may have any appropriate format such as, for example, a lookup table or index format; an array format; a hash table format; a graph, tree, or hierarchical format having a number of nodes; an object format that includes data fields, for instance similar to a record; or a combination of the foregoing. A data structure may include executable code for accessing and modifying the underlying structure and format of the data stored therein. In a more general sense, the data structure may be implemented as a data set that can store digital content without being constrained to any particular order or format. According to various embodiments disclosed herein, a data structure may be considered as a set or collection of one or more storage blocks that store corresponding document content segments in storage portions of the storage blocks. In such embodiments, a storage block, in addition to storing a document content segment in a storage portion of the storage block, may also have a buffer portion to accommodate changes to the stored content segment.

As used herein, the term "storage block buffer portion" (or more simply "buffer portion" or "buffer") refers to memory that is set aside for storage of data in a storage block. In this respect, a buffer portion refers to a portion of a storage block reserved for use when adding content to a storage block already having content stored in a storage portion thereof.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include a data server 103, a web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through local area network 133, wide area network 101 (e.g., the Internet), via direct or indirect connection, or via some other network. Users may interact with data server 103 using remote computers 107, 109, e.g., using a web browser to connect to data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of data server 103. Data server 103 may further include a random access memory (RAM) 113, a read only memory (ROM) 115, a network interface 117, input/output interfaces 119 (e.g., keyboard, mouse, display, printer, etc.), and a memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. Control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
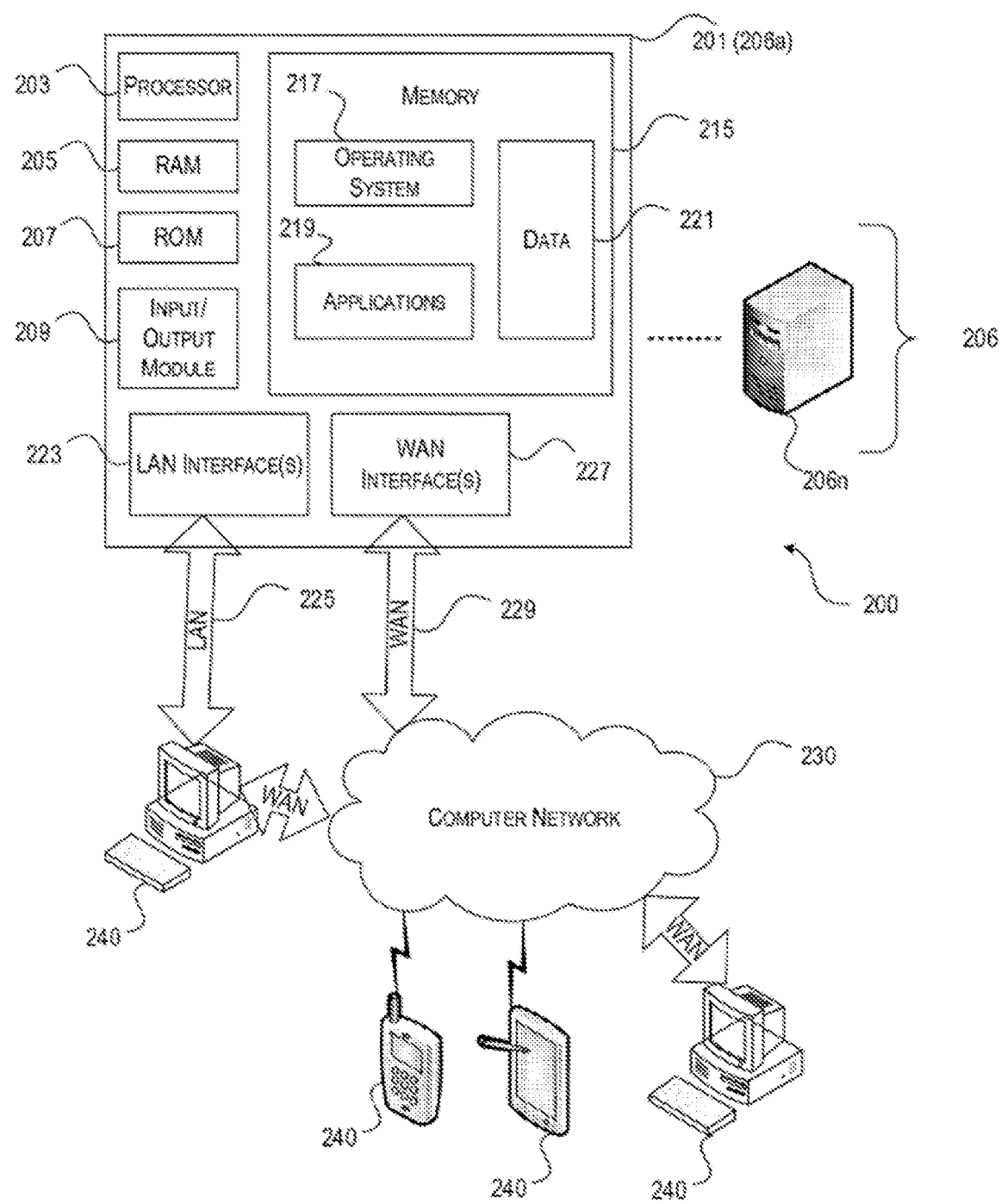
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide virtual machines (VMs) for client access devices. Computing device 201 may have a processor 203 for controlling overall operation of the server and its associated components, including a RAM 205, a ROM 207, an input/output (I/O) module 209, and a memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). Terminals 240 may be personal computers, mobile devices, laptop computers, tablets, or servers that include many or all the elements described above with respect to data server 103 or computing device 201. The network connections depicted in FIG. 2 include a local area network (LAN) 225 and a wide area network (WAN) 229 but may also include other networks. When used in a LAN networking environment, computing device 201 may be connected to LAN 225 through an adapter or network interface 223. When used in a WAN networking environment, computing device 201 may include a modem or other wide area network interface 227 for establishing communications over WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, computing environment 200 may include a network appliance installed between server(s) 206 and terminals 240. The network appliance may manage client/server connections, and in some cases can load balance client connections amongst a plurality of back-end servers 206.

Terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

Terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). Server 206, in some embodiments, may be referred to as any one of the following non-exhaustive terms: server(s), local machine; remote machine; server farm(s), or host computing device(s).

In one embodiment, terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on server 206 or a hypervisor executing on terminal 240.

Some embodiments include a terminal, such as terminal 240, that displays application output generated by an application remotely executing on a server, such as server 206, or other remotely located machine. In these embodiments, terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

Server 206, in some embodiments, uses a remote presentation protocol or other program to send data to a thin-client or remote-display application executing on the client to present display output generated by an application executing on server 206. The thin-client or remote-display protocol can be any one of the following non-exhaustive list of protocols: the Independent Computing Architecture (ICA) protocol developed by Citrix Systems, Inc. of Fort Lauderdale, Fla.; or the Remote Desktop Protocol (RDP) manufactured by Microsoft Corporation of Redmond, Wash.

A remote computing environment may include more than one server 206a-206n logically grouped together into a server farm 206, for example, in a cloud computing environment. Server farm 206 may include servers 206a-206n that are geographically dispersed while logically grouped together, or servers 206a-206n that are located proximate to each other while logically grouped together. Geographically dispersed servers 206a-206n within server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, server farm 206 may be administered as a single entity, while in other embodiments server farm 206 can include multiple server farms.

In some embodiments, server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from terminal 240, forwards the request to a second server 206b (not shown), and responds to the request generated by terminal 240 with a response from second server 206b (not shown). First server 206a may acquire an enumeration of applications available to terminal 240 as well as address information associated with an application server 206 hosting an application identified within the enumeration of applications. First server 206a can present a response to the client's request using a web interface and communicate directly with terminal 240 to provide terminal 240 with access to an identified application. One or more terminals 240 and/or one or more servers 206 may transmit data over network 230, e.g., network 101.

Figure 3:
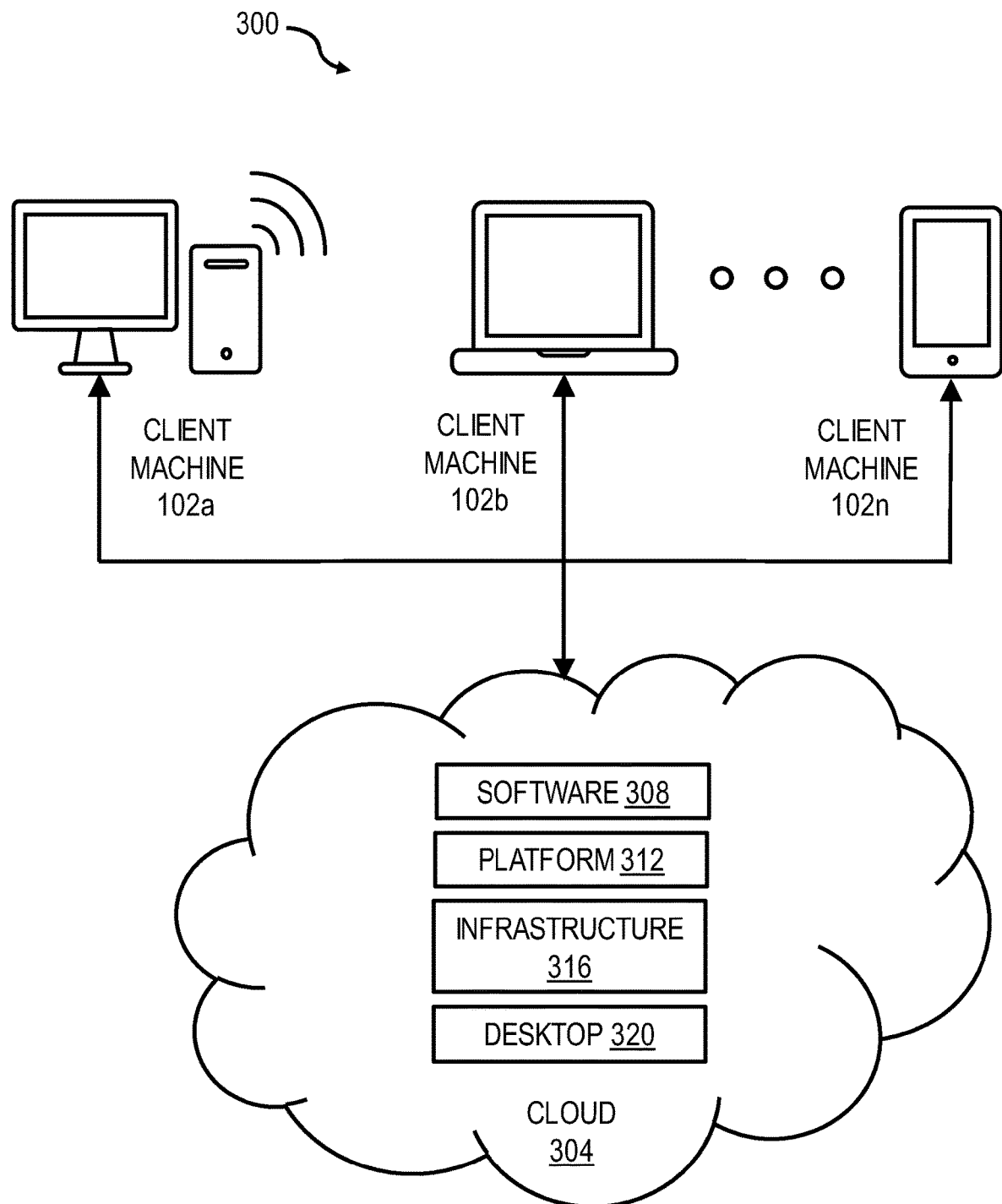
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one example implementation cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace U.S., Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
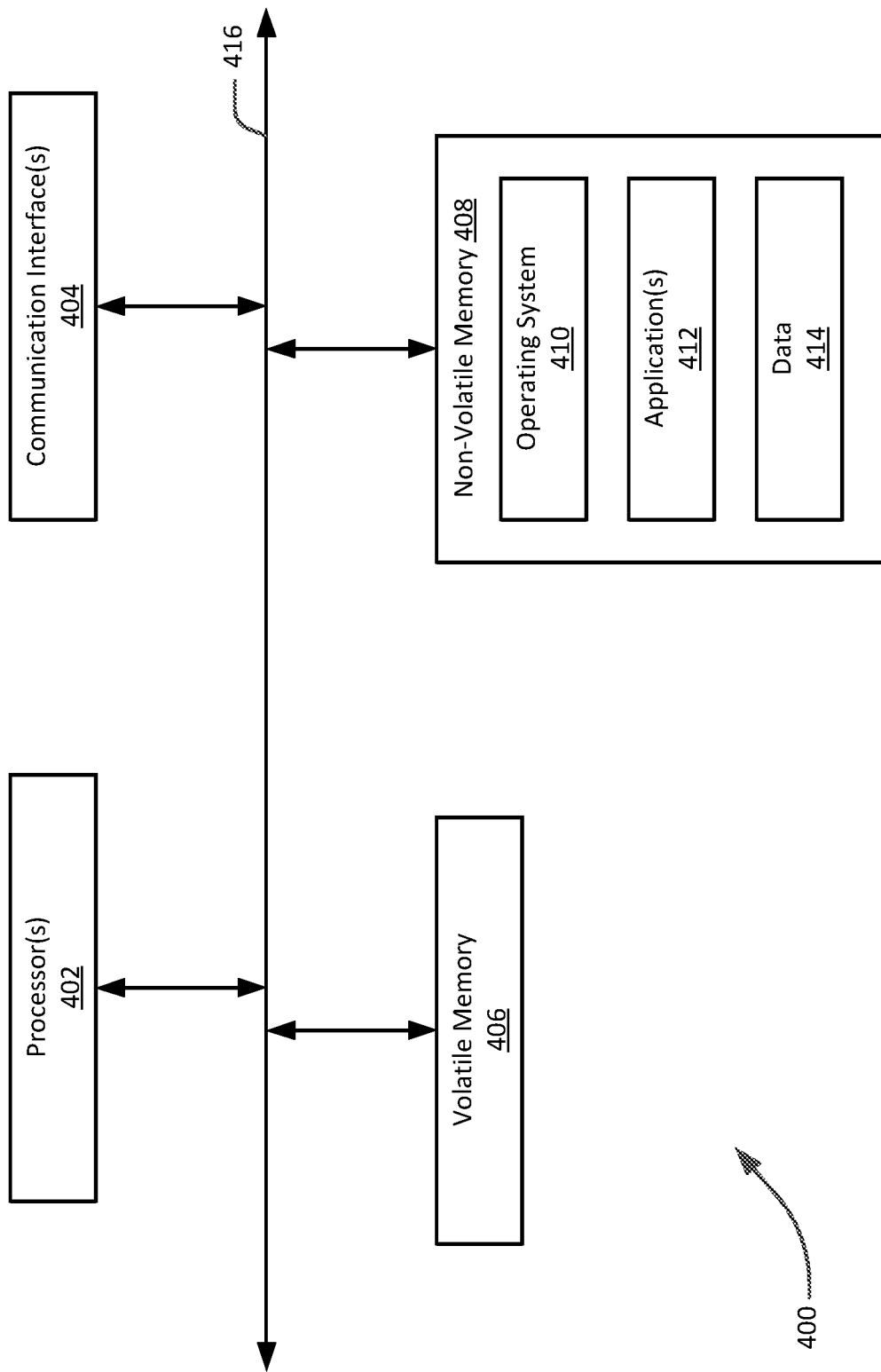
FIG. 4 is a block diagram illustrating selective components of an example computing device in which various aspects of the disclosure may be implemented, in accordance with an embodiment of the present disclosure.

FIG. 4 is a block diagram illustrating selective components of an example computing device 400 in which various aspects of the disclosure may be implemented, in accordance with an embodiment of the present disclosure. Computing device 400 is shown merely as an example of components 103, 105, 107, and 109 of FIG. 1, computing device 201 and terminals 240 of FIG. 2, and/or client machines 102a-102n of FIG. 3, for instance. However, the illustrated computing device 400 is shown merely as an example and one skilled in the art will appreciate that components 103, 105, 107, and 109 of FIG. 1, computing device 201 and terminals 240 of FIG. 2, and/or client machines 102a-102n of FIG. 3 may be implemented by any computing or processing environment and with any type of machine or set of machines that may have suitable hardware and/or software capable of operating as described herein.

As shown in FIG. 4, computing device 400 includes one or more processor(s) 402, one or more communication interface(s) 404, a volatile memory 406 (e.g., random access memory (RAM)), a non-volatile memory 408, and a communications bus 416.

Non-volatile memory 408 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

Non-volatile memory 408 stores an operating system 410, one or more applications 412, and data 414 such that, for example, computer instructions of operating system 410 and/or applications 412 are executed by processor(s) 402 out of volatile memory 406. For example, in some embodiments, applications 412 may cause computing device 400 to implement functionality in accordance with the various embodiments and/or examples described herein. In some embodiments, volatile memory 406 may include one or more types of RAM and/or a cache memory that may offer a faster response time than a main memory. Data may be entered using an input device of computing device 400 or received from I/O device(s) communicatively coupled to computing device 400. Various elements of computing device 400 may communicate via communications bus 416.

Processor(s) 402 may be implemented by one or more programmable processors to execute one or more executable instructions, such as applications 412 and/or a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, processor 402 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 402 may be analog, digital or mixed signal. In some embodiments, processor 402 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communication interface(s) 404 may include one or more interfaces to enable computing device 400 to access a computer network such as a Local Area Network (LAN), a Wide Area Network (WAN), a Personal Area Network (PAN), or the Internet through a variety of wired and/or wireless connections, including cellular connections.

In described embodiments, computing device 400 may execute an application on behalf of a user of a client device. For example, computing device 400 may execute one or more virtual machines managed by a hypervisor. Each virtual machine may provide an execution session within which applications execute on behalf of a user or a client device, such as a hosted desktop session. Computing device 400 may also execute a terminal services session to provide a hosted desktop environment. Computing device 400 may provide access to a remote computing environment including one or more applications, one or more desktop applications, and one or more desktop sessions in which one or more applications may execute.

For example, in some embodiments, a first computing device 400 may execute an application on behalf of a user of a client computing device (e.g., client 107 or 109 of FIG. 1), may execute a VM, which provides an execution session within which applications execute on behalf of a user or a client computing device (e.g., any of client machines 102a-102n of FIG. 3), such as a hosted desktop session, may execute a terminal services session to provide a hosted desktop environment, or may provide access to a computing environment including one or more of: one or more applications, one or more desktop applications, and one or more desktop sessions in which one or more applications may execute.

As will be described in more detail below in conjunction with FIGS. 5-16, and in accordance with embodiments disclosed herein, a database service may implement document storage in a way that facilitates consistent and concurrent read/write processing of the stored document. To this end, the database service may utilize storage blocks that have storage portions and buffer portions. To store a document, the database service may divide the content of a document into distinct content segments and store the content segments in the storage portions of corresponding storage blocks.

The database service may implement a read/write lock to support data consistency. A read/write lock for a stored document is a mechanism that prevents destructive interactions between users (e.g., processes or transactions) accessing the stored document. The read/write lock provides data consistency by providing synchronization between the users accessing the stored document. For example, as will be further described below, the exclusiveness of the read/write lock ensures that a user reading a document will be able to see all the updates to the document resulting from a previous release of the read/write lock. However, the exclusiveness of the read/write lock may result in reduced data read concurrency since the document cannot be read while the document is being written. To provide improved data read concurrency (e.g., effectively offset the reduction in data read concurrency resulting from implementation of the read/write lock), the database service utilizes storage blocks having buffer portions. The buffer portions allow for updates to the document to be made in a computationally efficient manner, which results in a reduction in the duration of time a user needs to possess the read/write lock.

Figure 5:
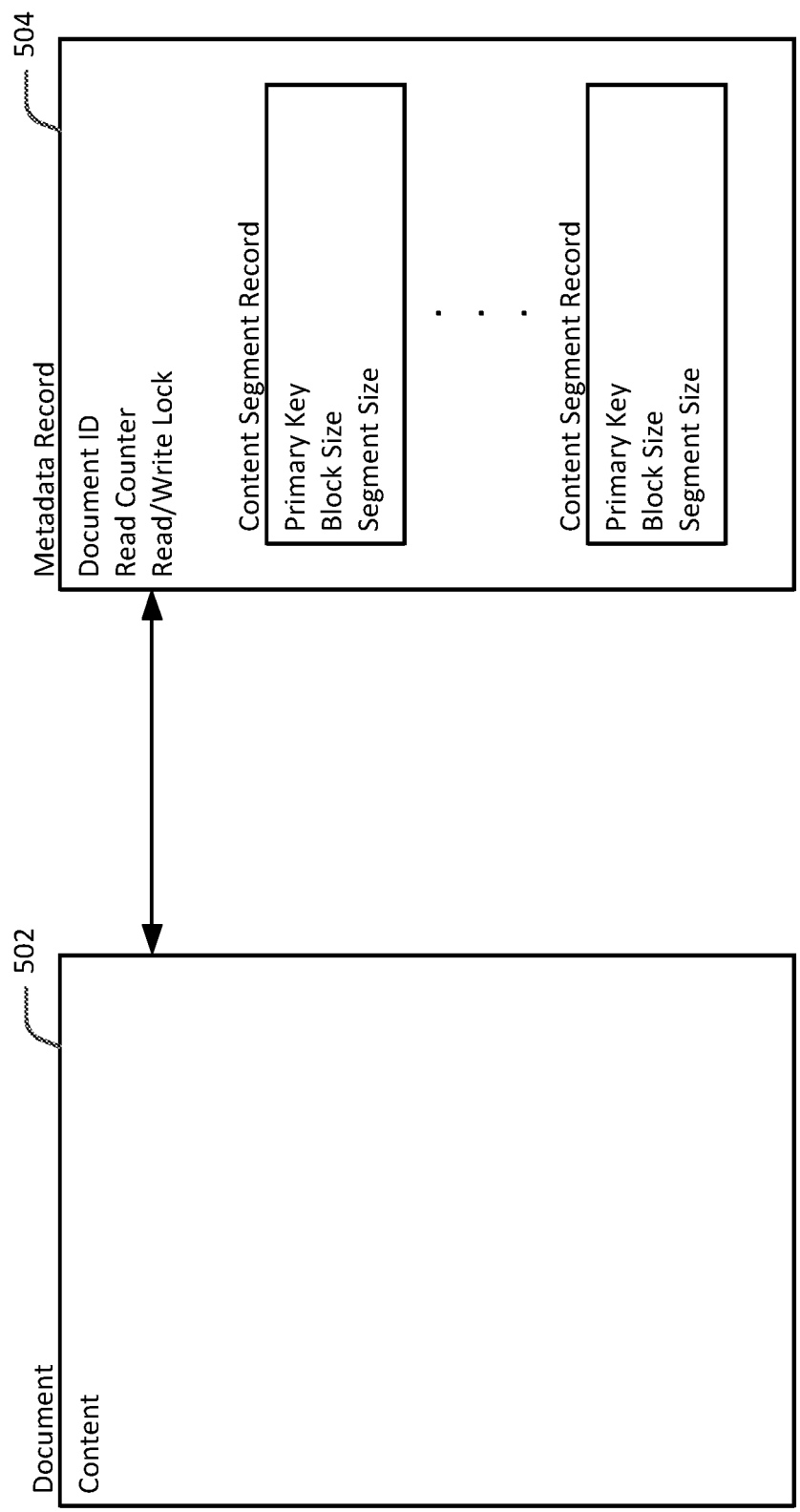
FIG. 5 is a diagram illustrating a document and an associated metadata record, in accordance with an embodiment of the present disclosure.

Referring now to FIG. 5, a document 502 which may be stored, for example, in a storage device, such as non-volatile memory 408 of computing device 400 of FIG. 4 (e.g., computer-readable medium of components data server 103 of FIG. 1, computing device 201 of FIG. 2, and/or client machines 102a-102n of FIG. 3), has an associated metadata record 504. In an embodiment, a database service, such as, for example, data server 103 of FIG. 1, may generate and maintain a metadata record for a stored document having content (such as metadata record 504 and document 502). Metadata record 504 may include information regarding the state of stored document 502 as well as information regarding the storage blocks being used to store the contents of the document. The information in metadata record 504 may be used to process document read and/or write operations.

Metadata record 504 includes a document identifier (Document ID), a count of outstanding read operations (Read Counter), and a read/write lock (Read/Write Lock). The document identifier uniquely identifies the document, in this case document 502, with which metadata record 504 is associated. The count of outstanding read operations indicates the number of read operations that are being currently performed on document 502. More particularly, the count of outstanding read operations indicates the number of users (e.g., processes) currently reading the content of document 502.

For example, the Read Counter value may be initialized to zero. Then, when a request to perform a read operation is received, the Read Counter value may be incremented by one to indicate an outstanding read operation. When an outstanding read operation completes, the Read Counter value may be decremented by one. Note that there may be multiple read operations being performed on a stored document. In other words, a read operation may be allowed as long as there is no write operation waiting to be performed.

The read/write lock may be a flag that may be set or cleared. The read/write lock, when set, indicates that document 502 is "locked" for writing. Conversely, the read/write lock being cleared indicates that document 502 is available for reading and/or writing. In one example implementation, the database service may allow a stored document, such as document 502, to be locked if there are no outstanding read operations. Also, once the stored document is locked for writing by a user, for example, the database service may not allow another user to read the locked document or lock the locked document for writing. In other words, the database service may allow a document to be locked by a single user and not multiple users. Use of the Read Counter and Read/Write Lock in this manner allows for providing data consistency for the stored documents.

Suppose, for example, a database service receives a request to perform a write operation when there are five read operations currently being performed on the stored document. In this case, the database service may not allow the document to be locked for writing. Rather, the database service may wait until the five outstanding read operations complete, as indicated by the Read Counter value, before allowing the document to be locked for writing. Accordingly, the database service may block the received write operation (e.g., block the user requesting to perform the write operation) until the five outstanding read operations complete at which time the database service locks the document and unblocks the write operation.

In some implementations, the database service may provide an indication that indicates that the document is not available for writing at the current time. Continuing the example case where the write operation is being blocked until the outstanding read operations complete, if a read operation is received while a write operation is being blocked, the database service may not allow the read operation but, rather, provide an indication that the document is not available for reading.

Still referring to FIG. 5, metadata record 504 also includes one or more content segment records. The order or sequence of the content segment records in metadata record 504 provide the indexing information needed to recreate document 502 (i.e., the stored document associated with the metadata record). To this end, the directory service may generate a content segment record for each storage block used to store content segments of document 502. As can be seen in FIG. 5, a content segment record includes a primary key (Primary Key) value, a storage block size (Block Size) value, and a segment size (Segment Size) value. The primary key value uniquely identifies the storage block. The database service may use the primary key value to retrieve the content segment stored in the storage block. The storage block size value indicates the size of the storage block. In an embodiment, the storage blocks may be of the same size. In other embodiments, the storage blocks may be of varying sizes.

For example, a first storage block and a second storage block may be of a first size, and a third storage block may be of a second, different size. In any case, the storage block size value may be set to a desired size, such as 1 MB, 2 MB, 4 MB, or any other suitable size, and may be tunable based on a desired performance of the database service.

For example, suppose the underlying database system supports data containers (e.g., data records) up to a specific size, such as 2 MB. In this case, the storage block size value may not be larger than the maximum data container size supported by the underlying database system. The segment size value indicates the size of the content segment that is being stored in the storage block. Note that the size of the content segment may not be larger than the size of the storage block in which the content segment is stored.

Figure 6A:
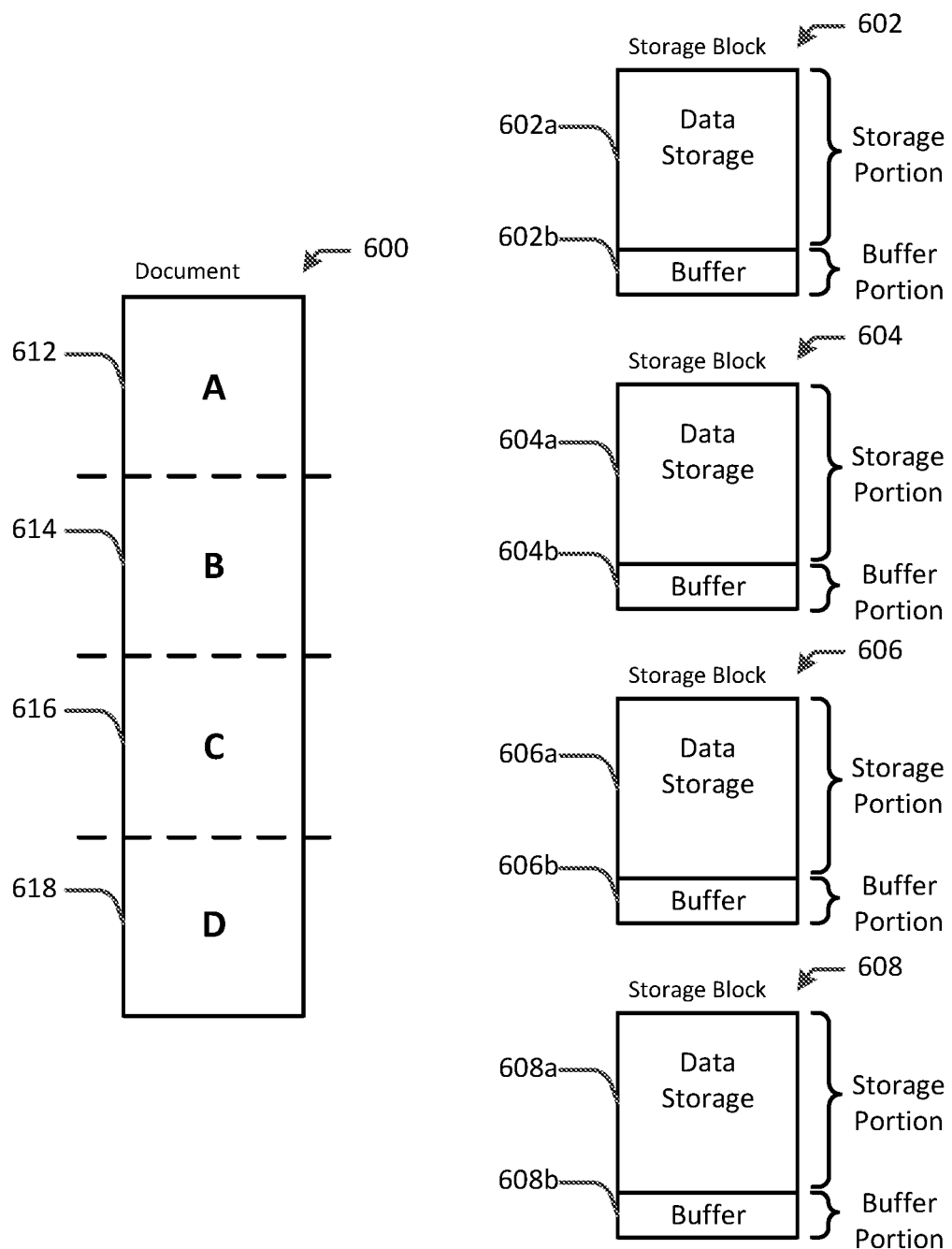
FIG. 6A is a diagram illustrating a segmented document and a plurality of storage blocks each of which include a buffer portion, in accordance with an embodiment of the present disclosure.
Figure 6B:
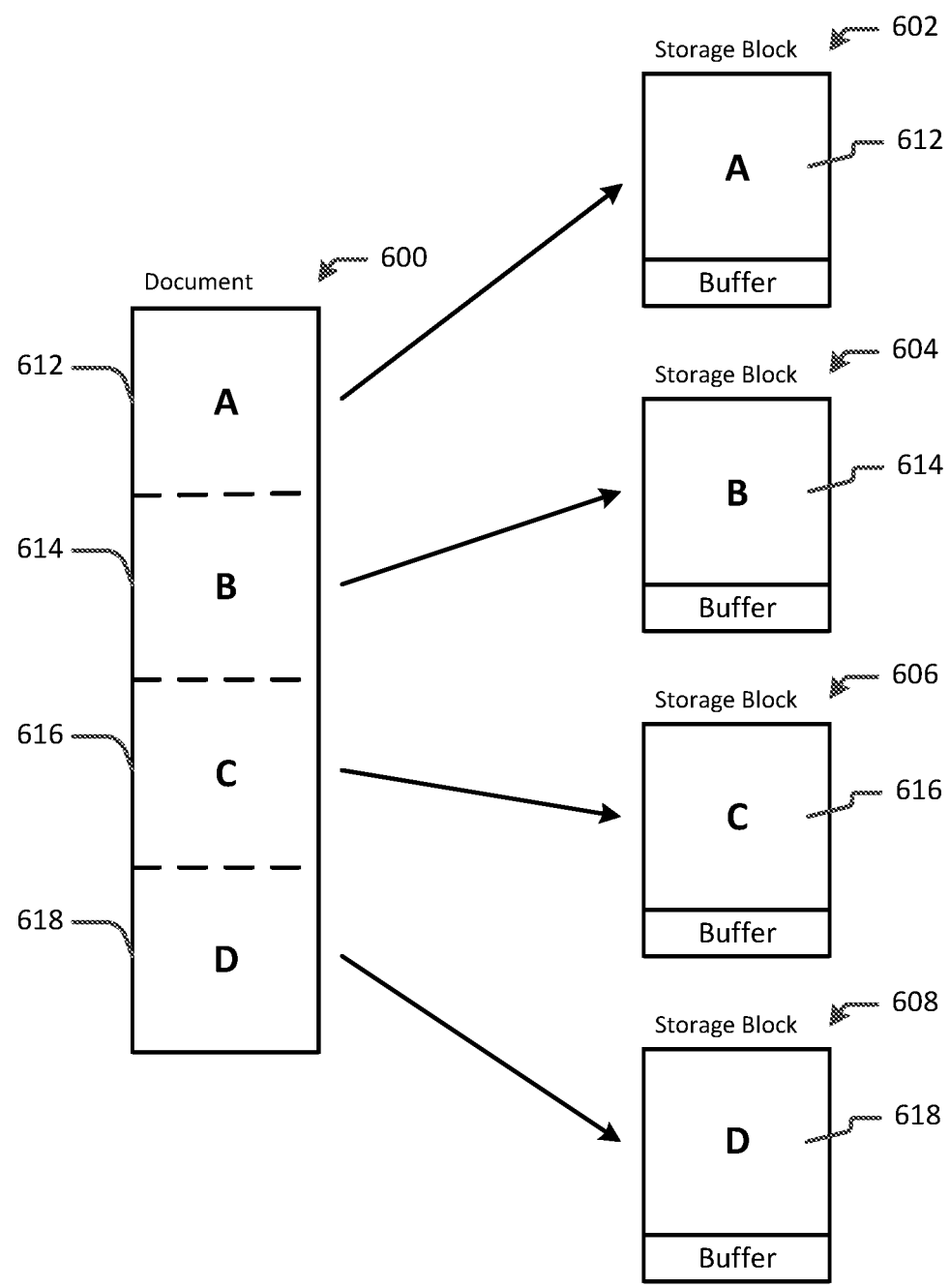
FIG. 6B is a diagram illustrating a plurality of document segments stored in a corresponding plurality of storage blocks, in accordance with an embodiment of the present disclosure.

FIGS. 6A and 6B collectively illustrate an example of storing a document across a plurality of storage blocks in a storage device. For instance, in the example use case of FIGS. 6A, 6B, the database service may receive a document 600 that is to be stored by the database service. Document 600 may be, for example, the same as or similar to document 502 in FIG. 5. To store document 600, the database service may first divide (or segment) the content of document 600 into distinct portions (or segments) for storing in corresponding storage blocks. In the illustrative embodiment of FIG. 6A, the document is divided into four distinct segments 612-618 for storing in corresponding storage blocks—here four distinct storage blocks 602-608. The number of document segments to generate (i.e., the number of divisions) may be based on a variety of factors including, but not limited to: the size of document 600, the size of the respective storage blocks in which the content segments are to be stored, and the size of initial buffer portions in the respective storage blocks.

As can be seen in FIG. 6A, storage blocks 602-608 may be configured by the database service to have a storage portion 602a-608a and a buffer portion 602b-608b. As previously described, the storage blocks may be of the same size, such as 2 MB, as one example. Furthermore, the size of the buffer portion (i.e., buffer) may be set as a percentage of the storage block size value, thus leaving the remaining portion of the storage block to serve as the storage portion of the storage block. For example, 20% of the storage block may be initially set aside as the buffer (i.e., initial size of the buffer portion in the storage block is 20% of the total size of the storage block). Then, in the case of a 2 MB storage block, the size of the initial buffer portion is 400 kilobytes (KB) (2 MB×0.2), where 1 MB=1,000 KB. Thus, accounting for the initial 400 KB buffer portion, a 2 MB storage block provides an initial storage capacity of 1,600 KB (i.e., the size of the storage portion of the block is 1,600 KB).

Knowing the initial storage capacity of a storage block, the database service can determine the number of storage blocks needed to store the content of the document. Continuing the example of 2 MB storage blocks and initial 400 KB buffer portions, suppose document 600 is 16 MB. Then, in this example case of document 600 being 16 MB in size, database service can determine that ten 2 MB storage blocks are needed to store the content of document 600 (16 MB÷1,600 KB=10 storage blocks).

In another example, suppose document 600 is 6 MB. Then, in this example, the database service may determine that four 2 MB storage blocks are needed to store the content of document 600 (determined as 6 MB÷1,600 KB=3.75, rounded up to the next whole number=4). Note that the size of the buffer portion may initially be preconfigured or otherwise set to a desired value, such as 15%, 20%, 25%, of the total storage block size value. Any other suitable percentage value or even any specific buffer size may, of course, also be used. For example, the buffer portion size may be initially set to a specific size—e.g., a 500 MB buffer portion size. In some embodiments, the buffer portion size may be tunable or otherwise adjustable, for example, by a system or service administrator (e.g., an authorized user of the database service).

Continuing the example of 2 MB storage blocks, 400 KB initial buffer portions, and the size of document 600 being 6 MB, as can be seen in FIG. 6B, the database service may determine that four storage blocks 602, 604, 606, 608 are needed to store the 6 MB content of document 600. Based on this determination, the database service can divide the content of document 600 into four content segments, a content segment A 612, a content segment B 614, a content segment C 616, and a content segment D 618. In an embodiment, the database service may divide document 600 such that the generated content segments A 612, B 614, C 616, D 618 are of the same size or almost the same size (i.e., the same size to the extent possible using segmentation techniques now known or later discovered).

For example, 6 MB document content may be segmented in four 1,500 KB content segments (i.e., content segments A 612, B 614, C 616, D 618 may each be 1,500 KB determined as 6 MB÷4). In other embodiments, a document may be segmented such that the generated content segments, except possibly the last content segment, is of the size that is capable of being stored in the storage block. In other words, the size of the generated content segments, except possibly the last content segment, is equal to the initial storage capacity of the storage block (size of the storage block—the size of the initial buffer portion). For example, in such embodiments, content segments A 612, B 614, C 616, may each be 1,600 KB and content segment D 618 may be 1,200 KB. In any case, the database service may store content segments A 612, B 614, C 616, D 618 in corresponding storage blocks 602, 604, 606, 608. In particular, and as can be seen in FIG. 6B, the database service may store content segment A 612 in storage block 602, content segment B 614 in storage block 604, content segment C 616 in storage block 606, and content segment D 618 in storage block 608. The database service may then generate a metadata record, such as metadata record 504 of FIG. 5, for stored document 600, and record the primary key values and segment size values for content segments A 612, B 614, C 616, D 618 stored in storage blocks 602, 604, 606, 608.

Note that the size of the buffer portion in the storage block is the storage capacity remaining after storage of the content segment in the storage block (Block Size—Segment Size). Accordingly, larger storage block sizes may allow for larger buffer portions (extra storage capacity), which may provide improved patching performance (e.g., a change to the content can be realized by modifying a single storage block). Note, however, that larger buffer portions consume memory that may not be utilized. Also note that the size(s) of the storage blocks may be limited by the storage capacities provided by an underlying database or file system being utilized by the database service.

Figure 7:
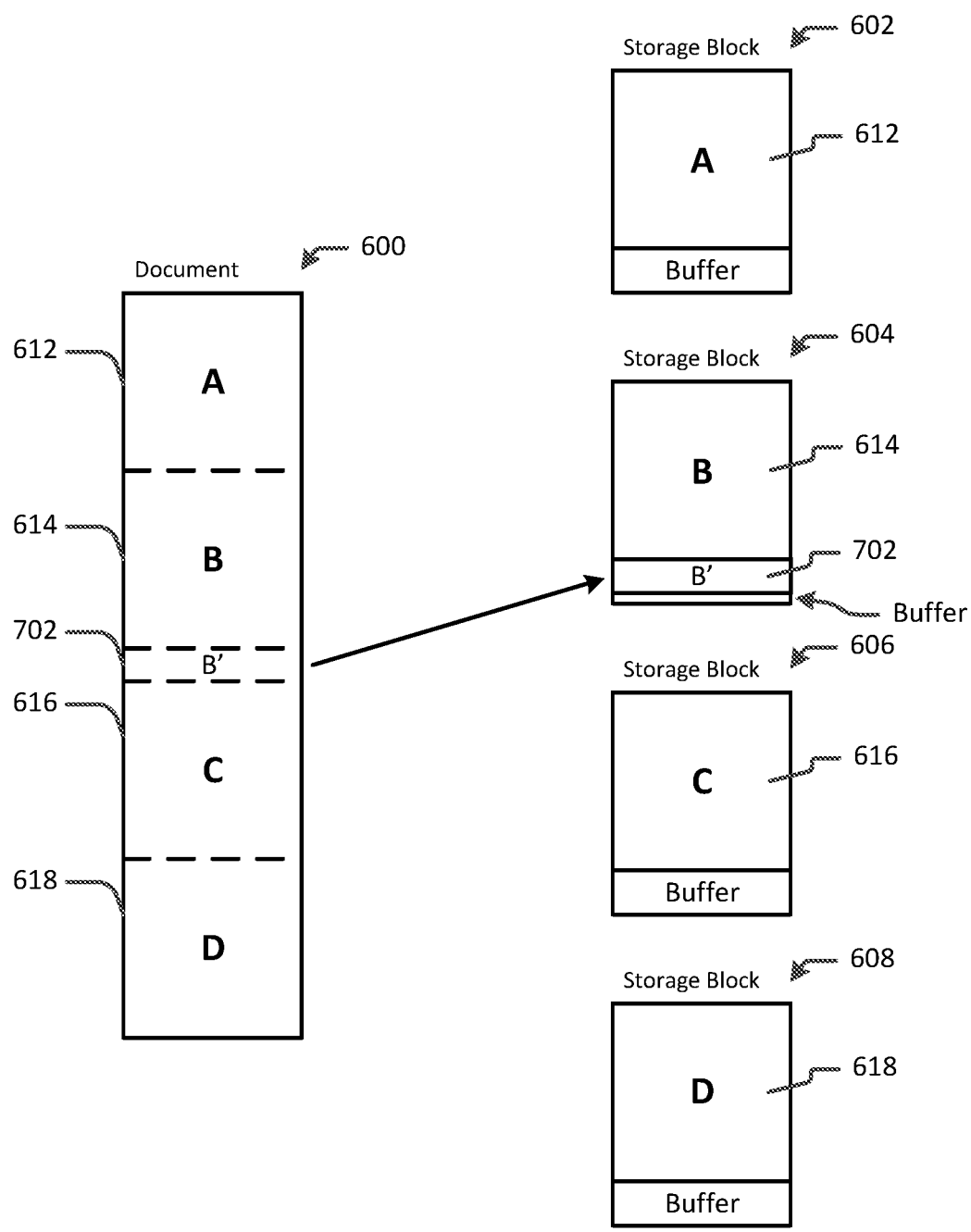
FIG. 7 is a diagram illustrating a change to the stored document of FIG. 6B, in accordance with an embodiment of the present disclosure.

FIG. 7 is a diagram illustrating a change to the stored document 600 of FIG. 6B, in accordance with an embodiment of the present disclosure. For instance, in an example use case, a user may have made a change (or changes) to a content segment of stored document 600 and, upon making the desired change, request or otherwise trigger a write operation to save (e.g., update) the changes back to stored document 600. To this end, the database service can determine whether the changes made to the content segment result in a net increase in the size of the content segment. In other words, the database service can determine whether the changed content segment has increased in size relative to the stored copy of the content segment (whether the size of the changed content segment is larger than the size of the stored copy of the content segment). If the changes result in an increase to the content segment, the database service can determine whether the available buffer in the storage block storing the content segment is large enough to accommodate the increase in content (e.g., the additional content to be stored). Note that the changes to the content segment may be any modification to the content such as new content being added to the content segment and/or existing content being deleted from the content segment.

For example, as can be seen in the illustrative embodiment of FIG. 7, the database service may have determined that the changes made to content segment B 614 result in an additional content B' 702. For example, in an implementation, the database service may perform a compare operation, such as a diff utility, to identify the changed content segment. The database service may have also determined that the buffer in storage block 604 is of sufficient size (sufficient capacity) to accommodate additional content B' 702. Accordingly, as can be seen in FIG. 7, the database service can store content segment B 614 and additional content B' 702 in storage block 604 using some or all of the buffer in storage block 604. Note that this causes a corresponding reduction in the size of the buffer. The database service may then update the segment size value in the metadata record for document 600 to reflect the size of the content segment stored in storage block 604.

Figure 8:
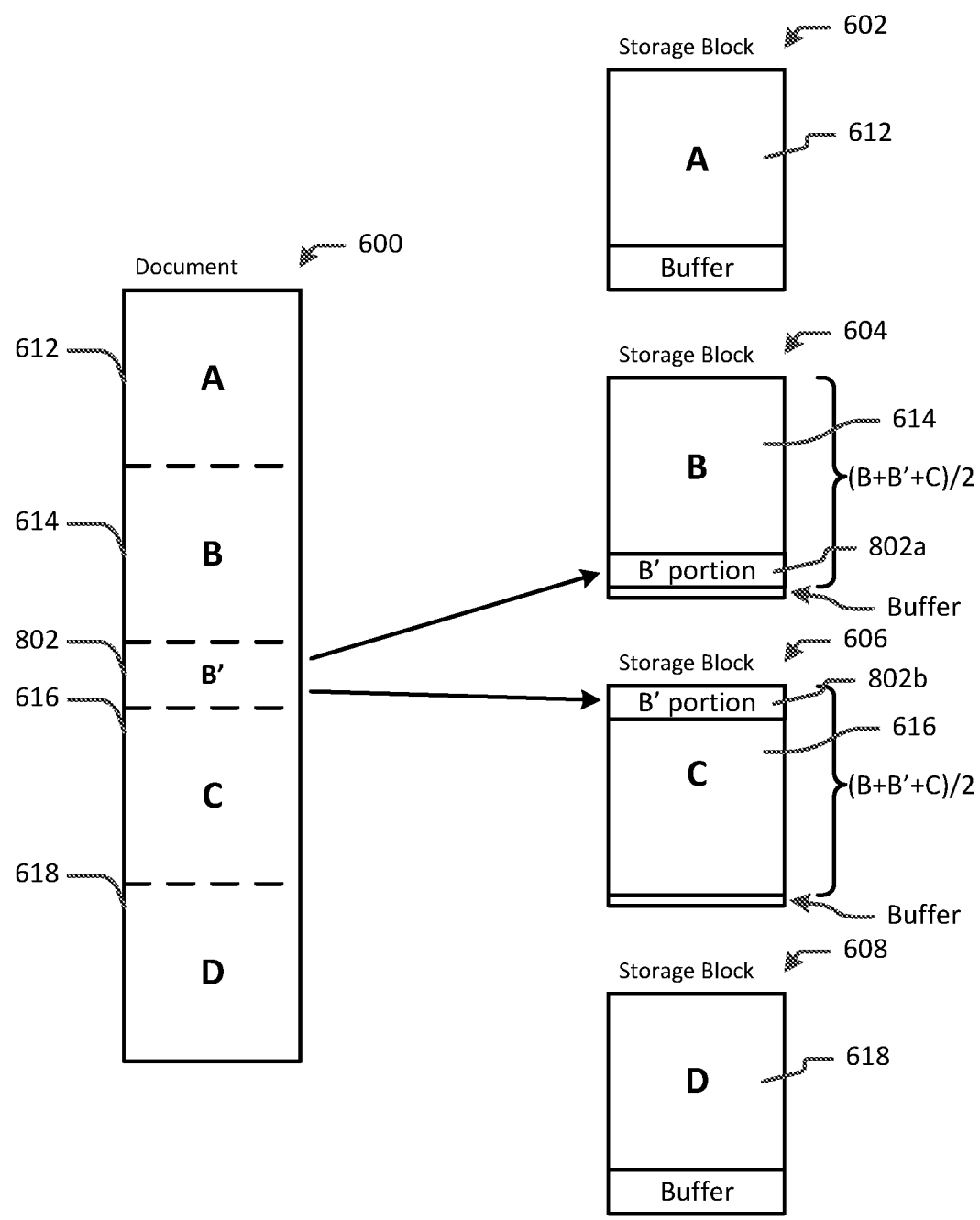
FIG. 8 is a diagram illustrating a change to the stored document of FIG. 6B, in accordance with an embodiment of the present disclosure.

Continuing the above example where changes are made to content segment B 614, as shown in FIG. 8, the database service may have determined that the changes made to content segment B 614 result in an additional content B' 802. The database service may have also determined that the buffer in storage block 604 is of insufficient size (insufficient capacity) to accommodate additional content B' 802. In this instance, the database service can check a buffer in a neighboring storage block. A neighboring storage block is a storage block that stores (or will store) a content segment that immediately precedes or immediately follows a content segment stored in a storage block of interest. Note that buffers in neighboring storage blocks are checked because the additional content that cannot be stored in a particular storage block needs to be stored in a neighboring storage block (e.g., at the beginning of a neighboring storage block that follows the particular storage block, or at the end of a neighboring storage block the precedes the particular storage block) to allow the stored document to be correctly reconstructed. Accordingly, in the illustrative embodiment of FIG. 8, storage block 602 and storage block 606 are neighbors of storage block 604. Storage block 608, however, is not a neighbor of storage block 604. Continuing the above example, the database service can check a buffer in neighboring storage block 602 and a buffer in neighboring storage block 606, to determine whether the buffer in storage block 604 and a buffer in a neighboring storage block combined is of sufficient size (sufficient capacity) to accommodate additional content B' 802. As can be seen in FIG. 8, the database service may have determined that the buffer in storage block 604 and the buffer in neighboring storage block 606 combined is of sufficient size (sufficient capacity) to accommodate additional content B' 802.

Accordingly, the database service can store content segment B 614 and a portion of additional content B' 802a in storage block 604 using some or all of the buffer in storage block 604, and store content segment C 616 and a remaining portion of additional content B' 802b in storage block 606 using some or all of the buffer in storage block 606. Here, remaining portion of additional content B' 802b is the portion of additional content B' 802 not being stored in storage block 604. Note that using the buffers in storage blocks 604, 606 to accommodate additional content B' 802 causes corresponding reductions in the respective sizes of the available buffers in storage blocks 604, 606. For example, as can be seen in FIG. 8, additional content B' 802a is stored using the available buffer in storage block 604, which causes the size of the buffer to be reduced. Regarding additional content B' 802b, additional content B' 802b is stored at the beginning of storage block 606 to allow additional content B' 802 (additional content B' 802a and additional content B' 802b) to be correctly reconstructed. Storing additional content B' 802b at the beginning of storage block 606 causes content segment C 616 to be stored below additional content B' 802b such that some of the available buffer in storage block 606 is used to store a portion of content segment C 616, thus causing the size of the buffer in storage block 606 to be reduced.

In some embodiments, the database service may adjust the respective sizes of the buffers in storage blocks 604, 606 to be of the same or substantially the same as practically possible. To accomplish this, the database service may determine the total amount of content that is to be stored in storage blocks 604, 606 (size of content segment B 614+ size content segment C 616+ size of additional content B' 802), and store one half of the total amount of content to be stored in storage block 604 and one half of the total amount of content to be stored in storage block 606. Storing additional content B' 802 in this manner results in the buffers of storage blocks 604, 606 being of the same or substantially the same size. The database service may then update the segment size values in the metadata record for document 600 to reflect the sizes of the content segments stored in storage blocks 604, 606.

Note that a storage block may have two neighboring storage blocks. For example, as can be seen in FIG. 8, storage blocks 602, 606 are neighbors of storage block 604. In such cases, the database service may use the neighboring storage block having the larger buffer. For example, the database service may have determined that the buffer in storage block 604 and the buffer in neighboring storage block 602 combined is also of sufficient size (sufficient capacity) to accommodate additional content B' 802. In this case, the database service may select the storage block (e.g., either storage block 602 or storage block 606) having the larger buffer to use in storing a portion of additional content B' 802. In some embodiments, the database service may select the storage block (e.g., either storage block 602 or storage block 606) having the smaller buffer, or arbitrarily select one of storage blocks 602, 606, to use in storing a portion of additional content B' 802.

Note that it may be the case that the respective buffer in either neighboring storage block can be combined with the buffer in storage block 604 to provide the needed capacity to store additional content B' 802. For example, the database service may have determined that the buffer in storage block 604 and the buffer in neighboring storage block 602 combined is also of sufficient size (sufficient capacity) to accommodate additional content B' 802. In this case, the database service may select the storage block (e.g., either storage block 602 or storage block 606) having the larger buffer to use in storing a portion of additional content B' 802. In some embodiments, the database service may select the storage block (e.g., either storage block 602 or storage block 606) having the smaller buffer, or arbitrarily select one of storage blocks 602, 606, to use in storing a portion of additional content B' 802.

Figure 9:
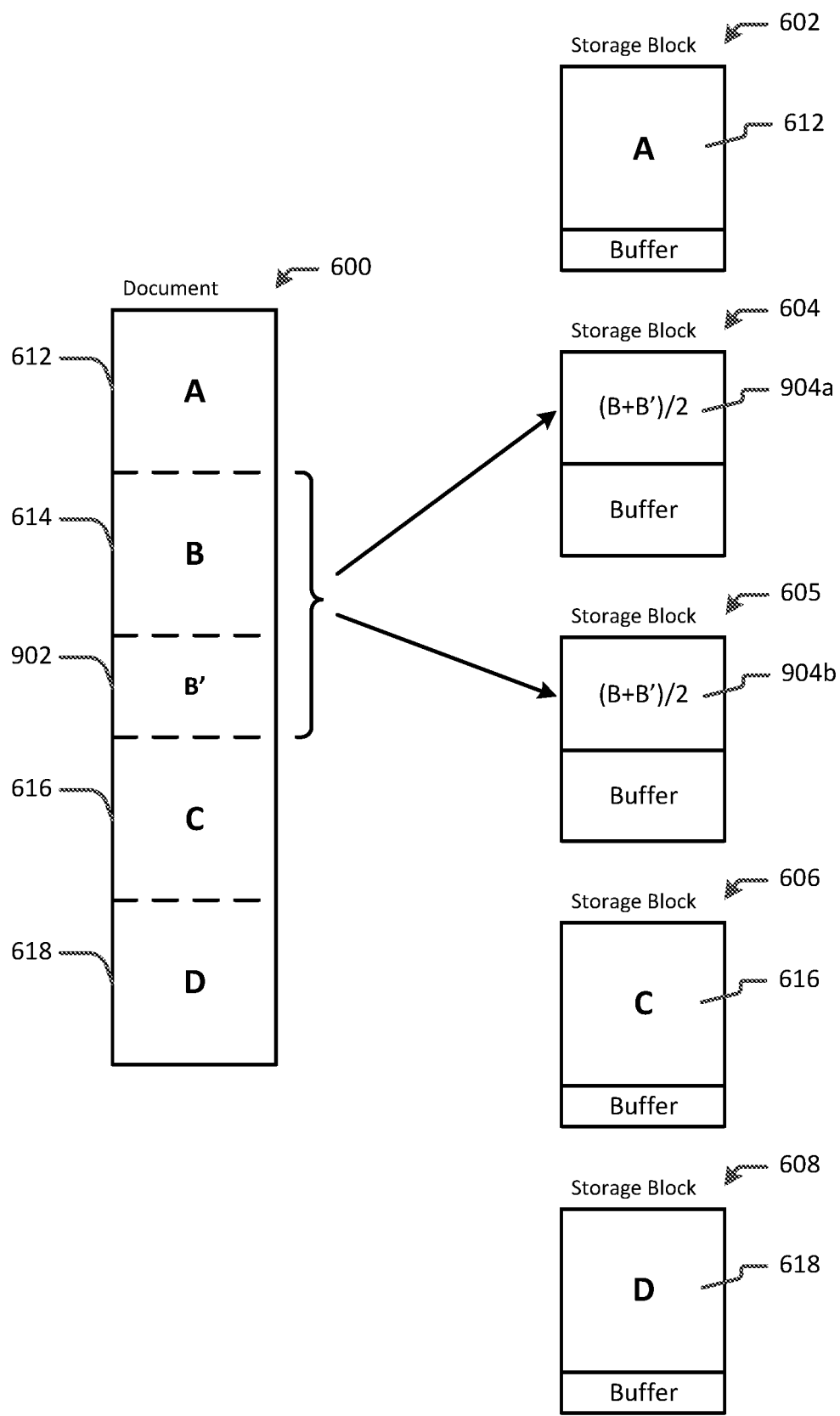
FIG. 9 is a diagram illustrating a change to the stored document of FIG. 6B, in accordance with an embodiment of the present disclosure.

Continuing the above example where changes are made to content segment B 614, as shown in FIG. 9, the database service may have determined that the changes made to content segment B 614 result in an additional content B' 902. The database service may have also determined that the buffer in storage block 604 and the buffer in neighboring storage block 602 combined, or the buffer in storage block 604 and the buffer in neighboring storage block 606 combined, is of insufficient size (insufficient capacity) to accommodate additional content B' 902. In this instance, the database service can generate a new storage block 605 and use the buffer in storage block 604 and new storage block 605 to accommodate additional content B' 902. In one example implementation, the database service can store a portion of additional content B' 902 in storage block 604 and the remaining portion of additional content B' 902 in new storage block 605. The portion of additional content B' 902 stored in storage block 604 may be of an amount (i.e., a size) up to the size of the buffer in storage block 604. In another example implementation, if new storage block 605 is of sufficient size to accommodate additional content B' 902, the database service can store additional content B' 902 entirely within new storage block 605. Note that, depending on the distribution of additional content B' 902 between storage block 604 and new storage block 605, there may be a reduction, increase, or no change in the size of the buffer in storage block 604. Also note that the storage capacity of new storage block 605 not used to store additional content B' 902 or a portion of additional content B' 902 serves as a buffer in new storage block 605. Also note that, depending on the amount of additional content B' 902 and the size of the storage block that can be generated, the database service may generate multiple new storage blocks to accommodate additional content B' 902.

In some embodiments, the database service may adjust the respective sizes of the buffers in storage block 604 and new storage block 605 to be of the same or substantially the same. To accomplish this, as can be seen in FIG. 9, the database service may determine the total amount of content that is to be stored in storage block 604 and new storage block 605 (size of content segment B 614+ size of additional content B' 902), and store one half of the total amount of content to be stored in storage block 604 (as indicated by reference number 904a) and one half of the total amount of content to be stored in new storage block 605 (as indicated by reference number 904b). Storing additional content B' 902 in this manner results in the buffers of storage block 604 and new storage block 605 being of the same or substantially the same size. The database service may then update the segment size values in the metadata record for document 600 to reflect the size of content segment 904a stored in storage block 604 and the size of content segment 904b stored in storage block 606.

Figure 10:
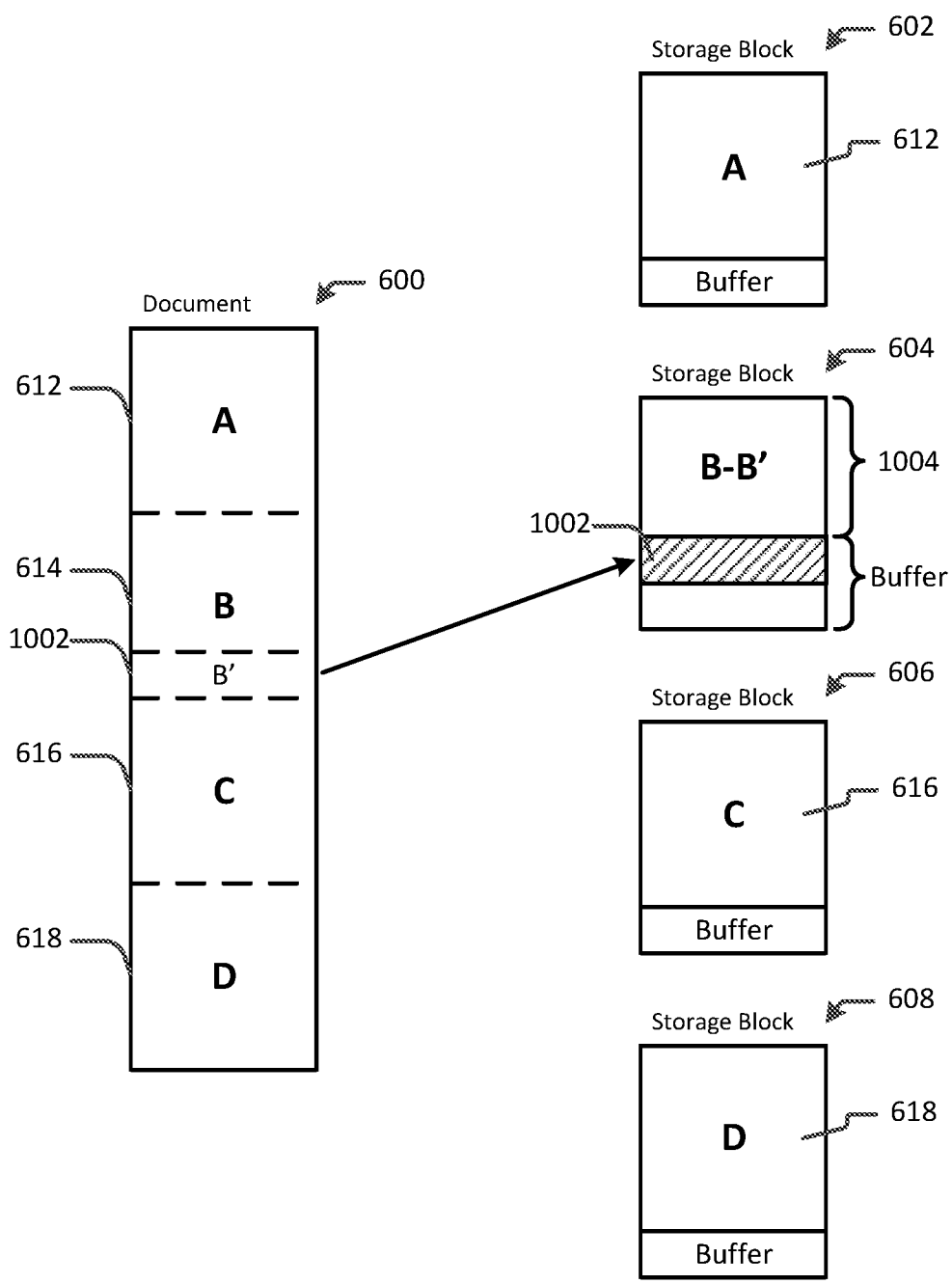
FIG. 10 is a diagram illustrating a change to the stored document of FIG. 6B, in accordance with an embodiment of the present disclosure.

FIG. 10 is a diagram illustrating a change to stored document 600 of FIG. 6B, in accordance with an embodiment of the present disclosure. For instance, similar to the example use case above, a user may have made a change (or changes) to a content segment of stored document 600 and, upon making the desired change, request or otherwise trigger a write operation to save the changes back to stored document 600. To this end, as can be seen in FIG. 10, the database service may have determined that the changes are made to content segment B 614 and that the changes result in a reduction of content B' 1002 from content segment B 614 (as shown by the diagonal hatched lines in FIG. 10). In other words, the changes result in content segment B 614 being reduced in size by the size (amount) of content B' 1002. In this respect, the resulting reduction of content B' 1002 may be treated as a deletion of content B' 1002 from content segment B 614 in that the amount represented by content B' 1002 is removed from content segment B 614. Accordingly, the database service can delete content B' 1002 from content segment B 614, which results in content segment 1004 being stored in storage block 604, as can be seen in FIG. 10. Note that this causes a corresponding increase in the size of the buffer in storage block 604. The database service may then update the segment size value in the metadata record for document 600 to reflect the size of content segment 1004 stored in storage block 604.

Figure 11:
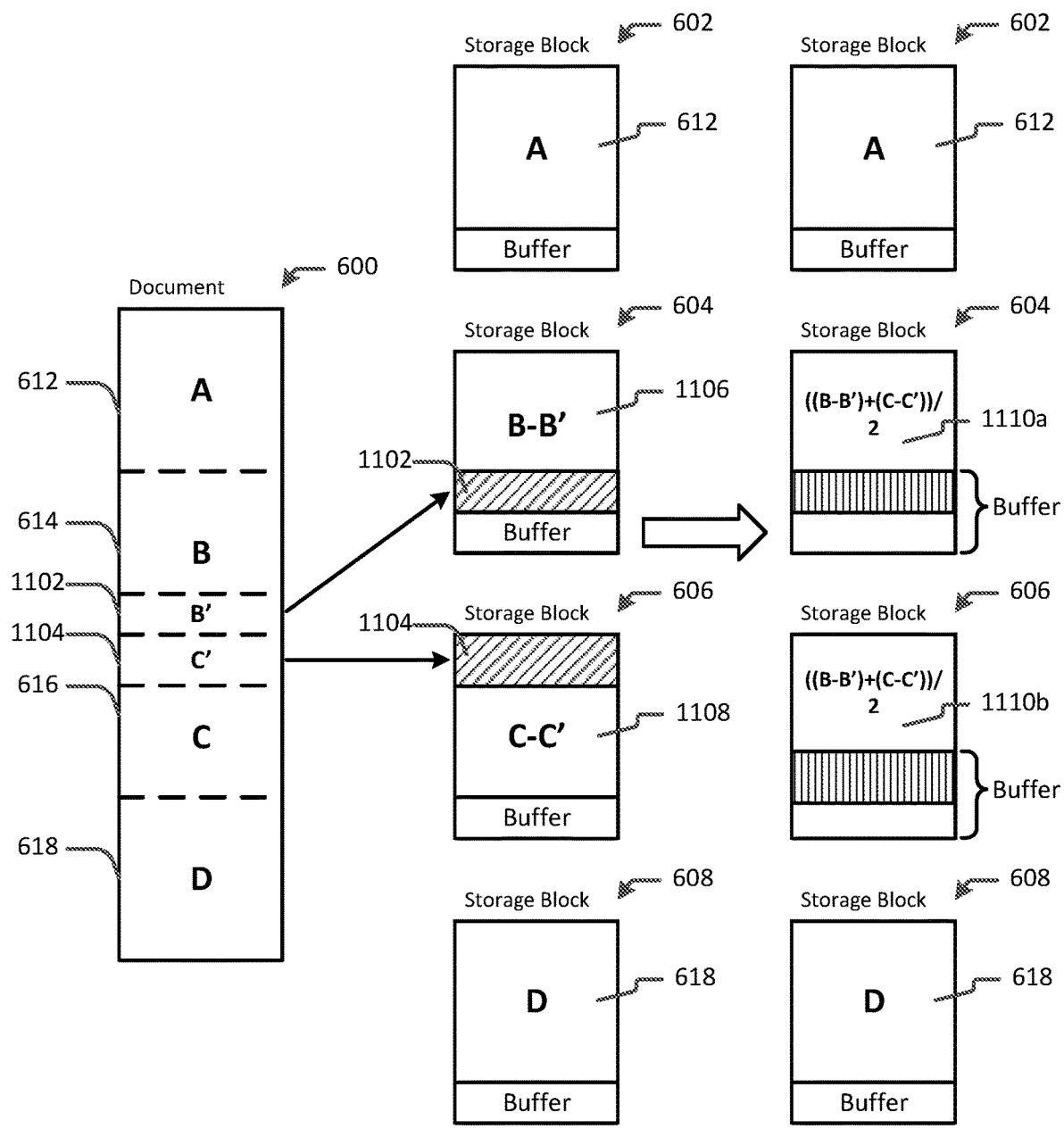
FIG. 11 is a diagram illustrating a change to the stored document of FIG. 6B, in accordance with an embodiment of the present disclosure.

Continuing the above example where changes are made to document 600 result in a deletion of content, as shown in FIG. 11, the database service may have determined that the changes are made to content segments B 614, C 616. More particularly, the database service may determine that the changes result in a reduction of content B' 1102 from content segment B 614 and a reduction of content C' 1104 from content segment C 616 (as shown by the diagonal hatched lines in FIG. 11). In this respect, the resulting reduction of content B' 1102 may be treated as a deletion of content B' 1102 from content segment B 614. Similarly, the resulting reduction of content C' 1104 may be treated as a deletion of content C' 1104 from content segment C 616. Accordingly, the database service can delete content B' 1102 from content segment B 614 and delete content C' 1104 from content segment C 616. As can be seen in FIG. 11, this results in content segment 1106 being stored in storage block 604 and content segment 1108 being stored in storage block 606. Note that this causes corresponding increases in the respective sizes of the buffers in storage blocks 604, 606 (as shown by the vertical hatched lines in FIG. 11).

In some embodiments, the database service may adjust the respective sizes of the buffers in storage blocks 604, 606 to be of the same or substantially the same. To accomplish this, the database service may determine the total amount of content remaining to be stored in storage blocks 604, 606 (size of content segment 1106+ size content segment 1108), and store one half of the total amount of content to be stored in storage block 604 (as indicated by reference number 1110*a*) and one half of the total amount of content to be stored in storage block 606 (as indicated by reference number 1110*b*). Storing deleting content B' 1102 and content C' 1104 in this manner results in the buffers of storage blocks 604, 606 being of the same or substantially the same size. The database service may then update the segment size values in the metadata record for document 600 to reflect the size of content segment 1110*a* stored in storage block 604 and the size of content segment 1110*b* stored in storage block 606.

Figure 12:
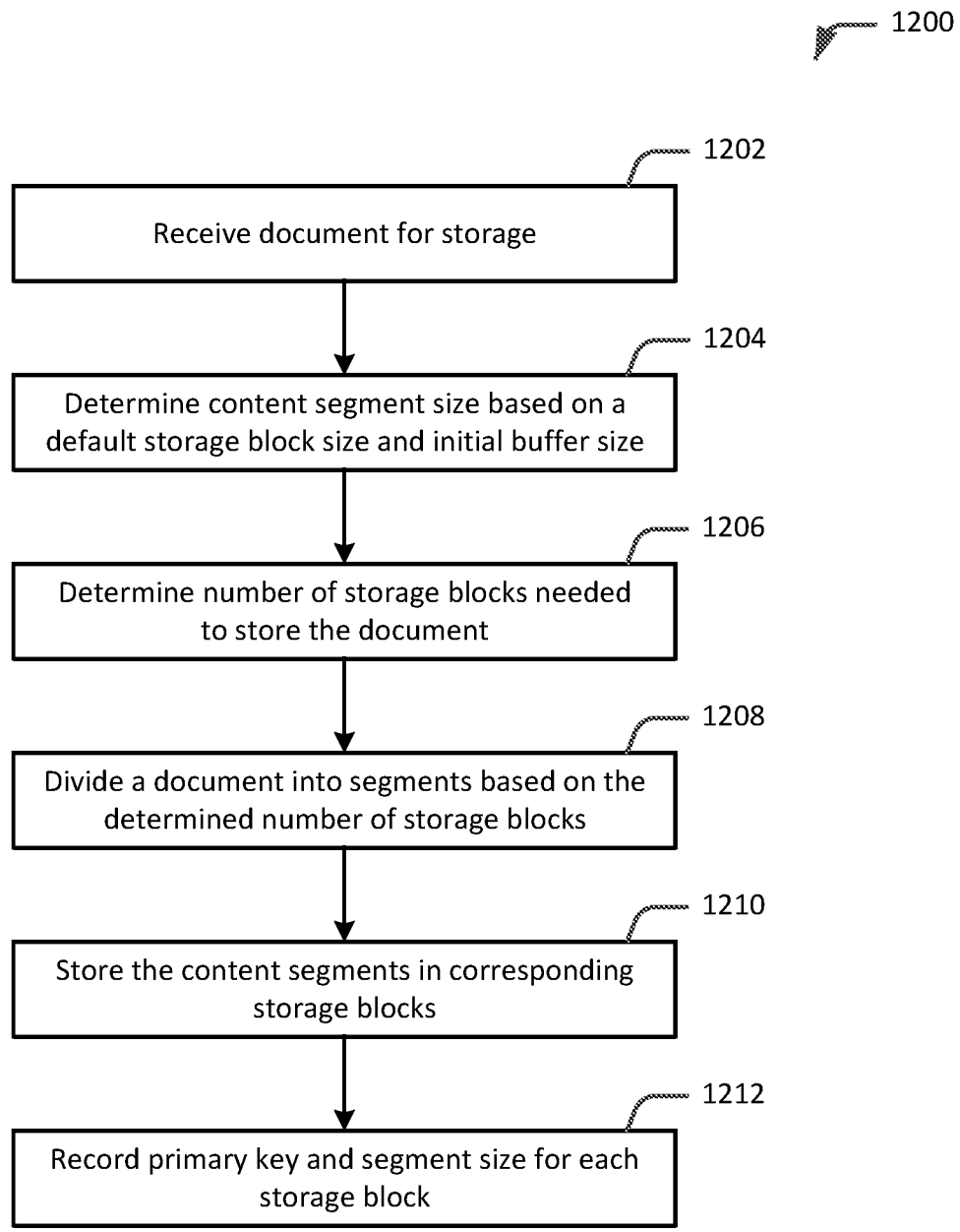
FIG. 12 is a flow diagram of an illustrative process for storing a document in one or more storage blocks, in accordance with an embodiment of the present disclosure.

FIG. 12 is a flow diagram of an illustrative process 1200 for storing a document in one or more storage blocks, in accordance with an embodiment of the present disclosure. The operations, functions, or actions illustrated in example process 1200, and example processes 1300, 1400, 1500, and 1600 further described below, may be stored as computer-executable instructions in a computer-readable medium, such as non-volatile memory 408 of computing device 400 of FIG. 4 (e.g., computer-readable medium of components data server 103 of FIG. 1, computing device 201 of FIG. 2, and/or client machines 102*a*-102*n* of FIG. 3). In some embodiments, example process 1200, and example processes 1300, 1400, 1500, and 1600 further described below, may be implemented by a database service, which may run on a suitable computing device, such as computing device 400 of FIG. 4, computing device 201 of FIG. 2, and/or client machines 102*a*-102*n* of FIG. 3. For example, the operations, functions, or actions described in the respective blocks of example process 1200, and example processes 1300, 1400, 1500, and 1600 further described below, may be implemented by applications 412 and/or data 414 of computing device 400.

With reference to example process 1200 of FIG. 12, at operation 1202, the database service may receive a document for storage by the service. For example, a user may use an interface provided by the database service to request storing of the document by the database service. The database service may support data storage and management for large documents (e.g., large data sets) of a size that exceeds the maximum data container size supported by the underlying database system used by the database service. To this end, the database service may utilize a distributed storage architecture where a document's contents are divided into segments, and the content segments stored in corresponding storage blocks, for example, of the underlying database system.

At operation 1204, the database service may determine a content segment size based on a storage block size and initial buffer size. The content segment size can be defined by the storage capacity in a storage block that is available for storing content and not set aside for use as the initial buffer. The content segment size value defines the maximum amount of content that may be initially stored in a storage block and still provide a buffer that is of a preconfigured initial buffer size. For example, assuming the storage block size is 1 MB and the preconfigured initial buffer size is 200 KB, the database service may determine the content segment size to be 800 KB. In this example, the 1 MB storage block provides an initial storage capacity of 800 KB for storing content while setting aside an initial buffer of 200 KB.

At operation 1206, the database service may determine the number of storage blocks needed to store the document. The number of storage blocks needed to store the document may be based on the content segment size value determined at operation 1204. For example, the number of storage blocks needed can be computed as the ratio of the size of the document (the amount of content to be stored) to the content segment size. Continuing the above example, assuming the document is a 6 MB document (e.g., the document includes 6 MB of content), the database service may determine that eight 1 MB storage blocks is needed to store the 6 MB document (6 MB÷800 KB=7.5, rounded up to the next whole number=8).

At operation 1208, the database service may divide the content of the document into segments based on the number of storage blocks determined at operation 1206. Continuing the above example of the 6 MB document, 1 MB storage blocks, and 200 KB buffers, the database service may divide the 6 MB content of the document into eight content segments. Dividing the content of the document in this manner allows for storing the resulting eight content segments in eight corresponding 1 MB storage blocks. In an embodiment, the content may be divided into equal size content segments. For example, the 6 MB content may be divided into eight 750 KB content segments.

At operation 1210, the database service may store the content segments generated from segmenting the document in corresponding storage blocks. Continuing the above example of the eight 750 KB content segments, 1 MB storage blocks, and 200 KB buffers, the database service may store the eight 750 KB content segments in eight corresponding 1 MB storage blocks. Note that storing equal size content segments in this manner results in equal size buffers in the corresponding storage blocks. Also note that since the size of a content segment (750 KB content segment) is less than the maximum amount of content that may be initially stored in the 1 MB storage block (800 KB), the size of the resulting buffer (250 KB) is larger than the preconfigured initial buffer size (200 KB).

At operation 1212, the database service may generate a metadata record, such as metadata record 504 of FIG. 5, for the stored document. The database service may then record the primary key values to identify the eight storage blocks used to store the eight content segments of the document. The database service may also record the segment size values to indicate the respective sizes of the content segments (e.g., 750 KB) stored in the eight storage blocks. In an implementation, the database service may also maintain a record of which content segment is stored in a particular storage block.

Figure 13:
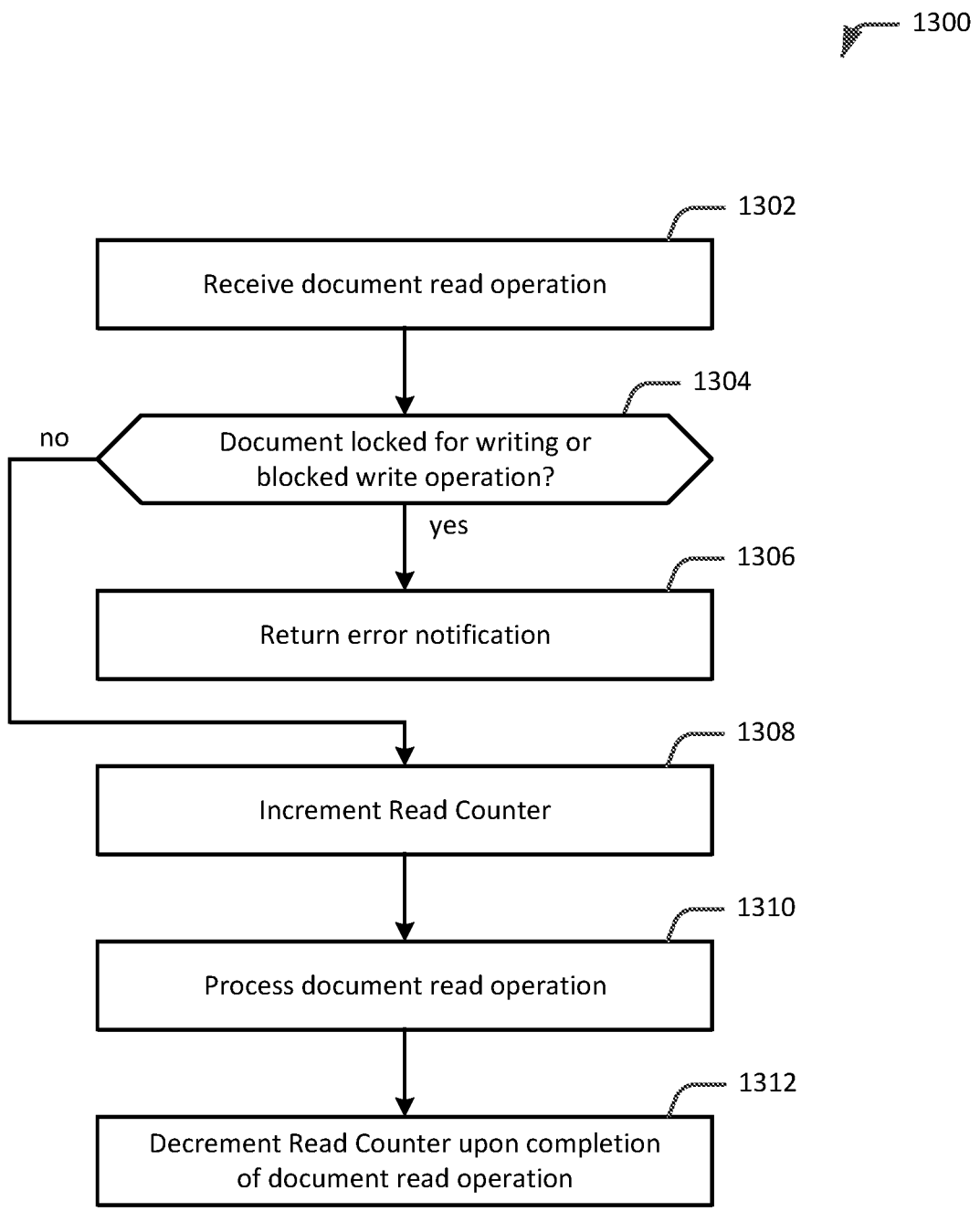
FIG. 13 is a flow diagram of an illustrative process for performing a document read operation, in accordance with an embodiment of the present disclosure.

FIG. 13 is a flow diagram of an illustrative process 1300 for performing a document read operation, in accordance with an embodiment of the present disclosure. For example, a user may use an interface provided by the database service to issue a read operation to retrieve a stored document (e.g., a query to retrieve a document). At operation 1302, the database service may receive the document read operation made by the user. At operation 1304, the database service may determine whether the requested document is locked for writing or whether there is a blocked write operation on the document. For example, the requested document may be locked for writing, for example, as indicated by the Read/Write lock in the metadata record for the document, by another user. It may be the case that the database service is currently blocking a write operation on the document issued by another user. For example, the database service may block a write operation on a document if the write operation is received when a read operation on the document is being performed. In any case, the database service may not perform a read operation on a document (not allow the document to be read) if the request document is locked for writing or there is a write operation on the document waiting to be performed.

If the database service determines that the request document is locked for writing or there is a write operation on the document waiting to be performed, then, at operation 1306, the database service may return or otherwise issue a notification. For example, the notification may inform the user that the requested read operation is not permitted and/or cannot be performed at the current time.

Otherwise, if the database service determines that the request document is not locked for writing and there is no write operation on the document waiting to be performed, then, at operation 1308, the database service may increment the Read Counter value in the metadata record for the document. The database service may increment the counter to provide an indication that a read operation on the document is being performed (indication that the document is currently being read).

At operation 1310, the database service may perform the requested read operation on the document. For example, the database service may use the Primary Key values in the metadata record to identify the storage blocks that are storing the document content. Upon identifying the storage blocks, the database service may retrieve the content segments stored in the storage blocks and assemble the content segments to recreate the document. The database service may then provide or otherwise make available the document to the requesting user. At operation 1312, the database service may decrement the Read Counter value in the metadata record for the document upon processing the document read operation.

Figure 14:
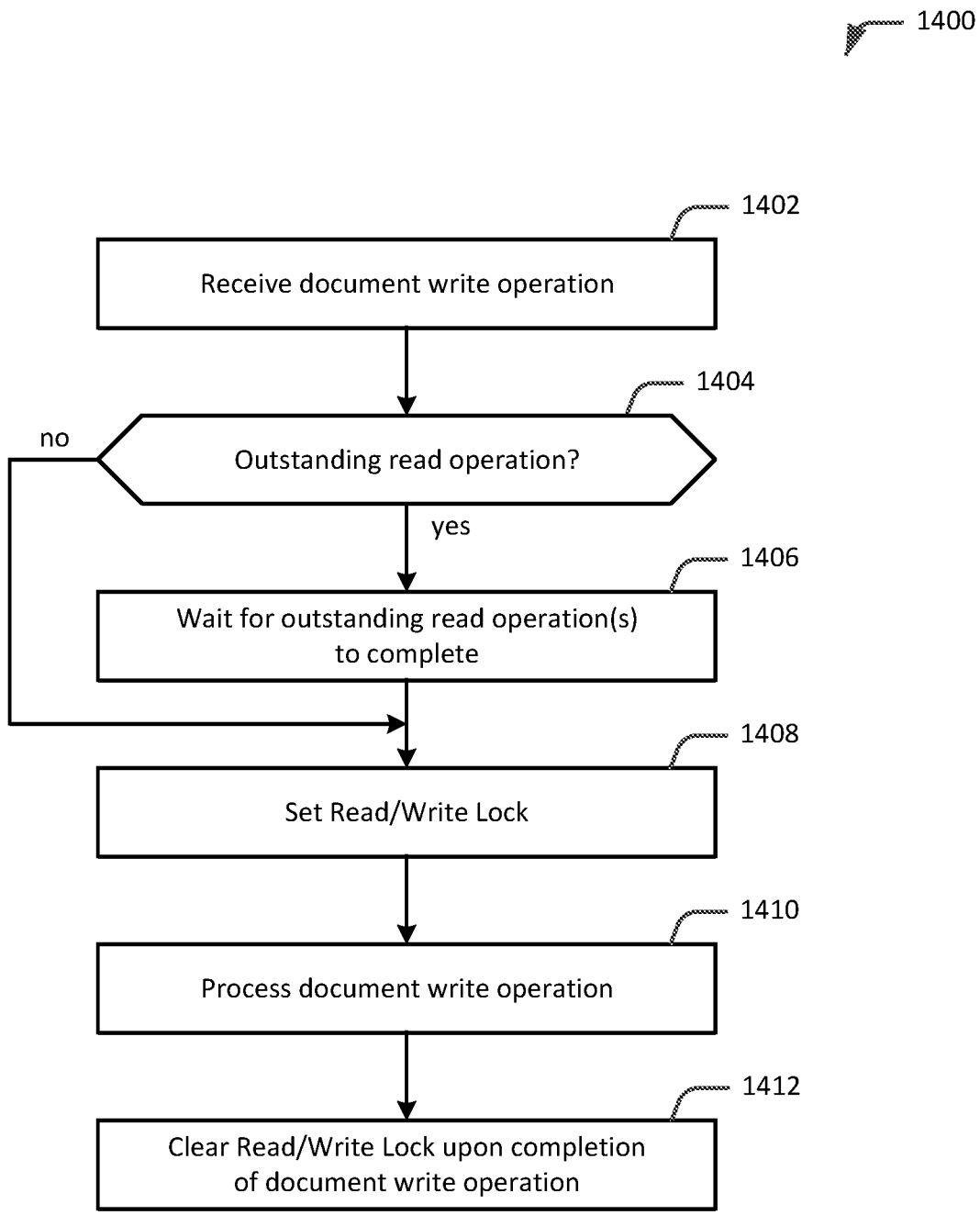
FIG. 14 is a flow diagram of an illustrative process for performing a document write operation, in accordance with an embodiment of the present disclosure.

FIG. 14 is a flow diagram of an illustrative process 1400 for performing a document write, in accordance with an embodiment of the present disclosure. For example, a user may have made retrieved a stored document from the database service and made desired changes to the document (e.g., edits to the document content). Upon making the changes to the content, the user may use an interface provided by the database service to issue a write operation to update or save the changes to the stored document. At operation 1402, the database service may receive the document write request made by the user. At operation 1404, the database service may determine if there are read operations on the document being currently performed. For example, outstanding read operations on the document may be indicated by the Read Counter value in the metadata record for the document. The database service may not perform a write operation on a document (e.g., not allow edits to the document to be written or saved) if the document is being currently read by another user. If the database service determines that the document is currently being read, then, at operation 1406, the database service may block (i.e., cause the write operation to wait) until the current read operation(s) on the document complete. In an implementation, rather than blocking the write operation, the database service may return or otherwise issue a notification. For example, the notification may inform the user that the requested write operation is not permitted and/or cannot be performed at the current time.

Otherwise, if the database service determines that the that the document is currently being read or upon waiting for any current read operation(s) on the document to complete, then, at operation 1408, the database service may set the Read/Write Lock in the metadata record for the document. The database service may set this lock to provide an indication that a write operation on the document is being performed (indication that the document is currently being written).

At operation 1410, the database service may process the requested write operation on the document. For example, in an implementation, the database service may compare the document changed by the user (the document being saved) and the currently stored copy of the document to identify the differences (the change(s) to the content). The changes may be additional content being added to one or more content segments and/or content being deleted from one or more content segments of the document. In any case, the database service can add additional content to one or more content segments (as further described at least with respect to process 1500 of FIGS. 15A and 15A) and/or delete content from one or more content segments (as further described at least with respect to process 1600 of FIG. 16) according to the identified changes.

Upon performing the document write operation, at operation 1412, the database service may clear the Read/Write Lock in the metadata record for the document upon processing the document write operation. Clearing this lock indicates that a write operation is not being performed on the document and that the document may be read or written.

Figure 15A:
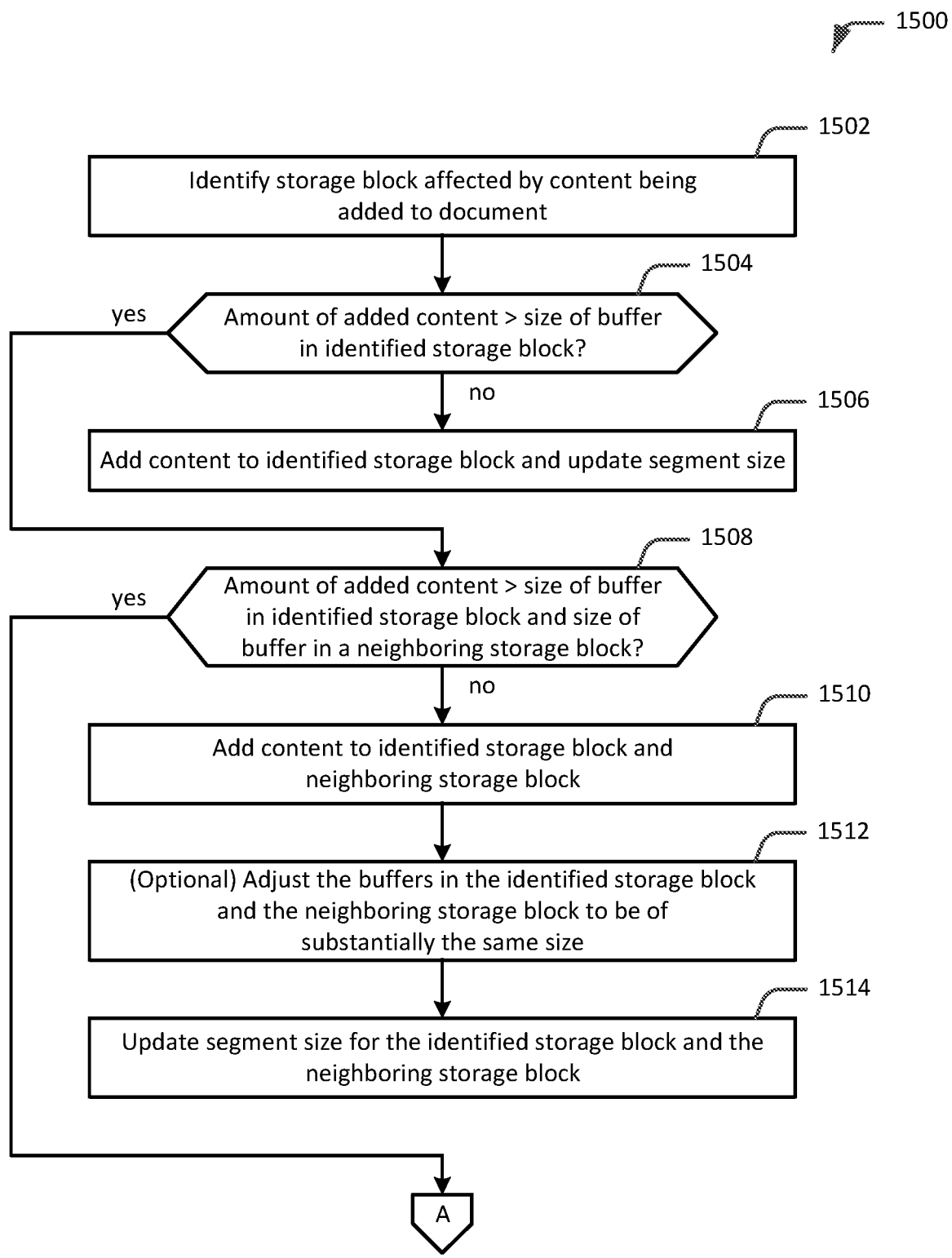
FIGS. 15A and 15B collectively show a flow diagram of an illustrative process 1500 for addition of content to a content segment of a stored document, in accordance with an embodiment of the present disclosure.
Figure 15B:
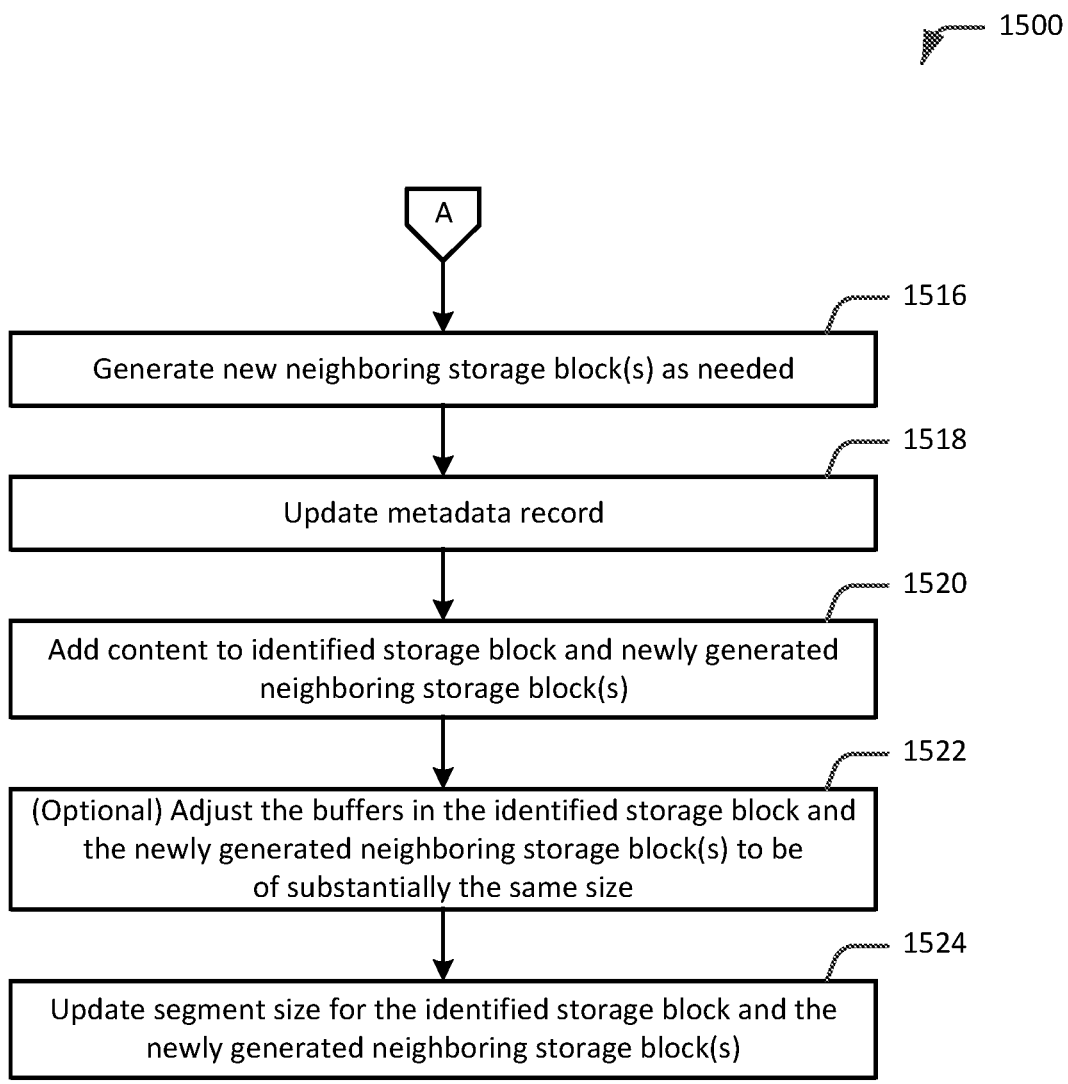

FIGS. 15A and 15B collectively show a flow diagram of an illustrative process 1500 for addition of content to a content segment of a stored document, in accordance with an embodiment of the present disclosure. At operation 1502, the database service may identify the storage block affected by the additional content. For example, as described previously, the database service can compare the document being saved and the currently stored copy of the document to identify the differences. Then, for each identified difference (addition of content), the database service can identify the storage block that is affected by the addition of content. At operation 1504, the database service may determine whether the amount of the content added to the content segment (i.e., the increase in the content segment causes by the added content) is larger than the size of the buffer in the identified storage block. Here, the database service is determining whether the buffer in the identified storage block is sufficient to accommodate the amount of additional content.

If the database service determines that the amount of the content added to the content segment is not larger than the size of the buffer in the identified storage block, then, at operation 1506, the database service may add the additional content to the identified storage block using the buffer in the identified storage block. The database service may then update the segment size value in the metadata record for the document to reflect the increase in size of the content segment being stored in the identified storage block.

Otherwise, if the database service determines that the amount of the content added to the content segment is larger than the size of the buffer in the identified storage block, then, at operation 1508, the database service may determine whether the amount of the content added to the content segment is larger than the size of the buffer in the identified storage block and a size of a buffer in a neighboring storage block. In the case where the identified storage block has two neighboring storage blocks, the neighboring storage block having the larger buffer may be used by the database service.

If the database service determines that the amount of the content added to the content segment is not larger than the size of the buffer in the identified storage block and a size of a buffer in a neighboring storage block, then, at operation 1510, the database service may add the additional content to the identified storage block and the neighboring storage block using the respective buffers in the identified storage block and the neighboring storage block. For example, the database service may add a portion of the additional content to the identified storage block using its buffer and add the remaining portion of the additional content to the neighboring storage block using its buffer. Note that adding the additional content to the identified storage block and the neighboring storage block using the respective buffers results in corresponding reductions in the respective sizes of the buffers. At operation 1512, the database service may optionally adjust the buffers in the identified storage block and the neighboring storage block (e.g., the buffers remaining in the identified storage block and the neighboring storage block) to be of the same size or substantially the same size. At operation 1514, the database service may update the segment size values in the metadata record for the document to reflect the sizes of the respective content segments stored in the identified storage block and the neighboring storage block.

Otherwise, if the database service determines that the amount of the content added to the content segment is larger than the size of the buffer in the identified storage block and a size of a buffer in a neighboring storage block, then, at operation 1516, the database service may generate one or more new, neighboring storage blocks, as needed. For example, suppose the amount of the additional content is 2 MB, the size of the buffer in the identified storage block is 400 KB, and the storage block size (size of a new storage block) is 2 MB. In this case, the database service may generate one new storage block to use with the buffer in the identified storage block to accommodate the additional content. If the amount of the additional content is larger than 2,400 KB (size of the available buffer+ size of a new storage block), the database service may generate additional (e.g., two or more) storage blocks depending on the amount of the additional content. Note that the storage capacity provided by a new storage block may be defined by the size of the new storage block. In other words, in the case of a newly generated storage block, the buffer is the entire storage block.

At operation 1518, the database service may update the information in the metadata record for the document to reflect the new, neighboring storage block(s) generated for storing the additional content. At operation 1520, the database service may add the additional content to the identified storage block and the new, neighboring storage block(s) using the buffer in the identified storage block and the storage capacity provided by the new, neighboring storage block(s). At operation 1522, the database service may optionally adjust the buffers in the identified storage block and the new, neighboring storage block(s) (e.g., the buffers remaining in the identified storage block and the new, neighboring storage block(s)) to be of the same size or substantially the same size. At operation 1524, the database service may update the segment size values in the metadata record for the document to reflect the sizes of the respective content segments stored in the identified storage block and the new, neighboring storage block(s).

Figure 16:
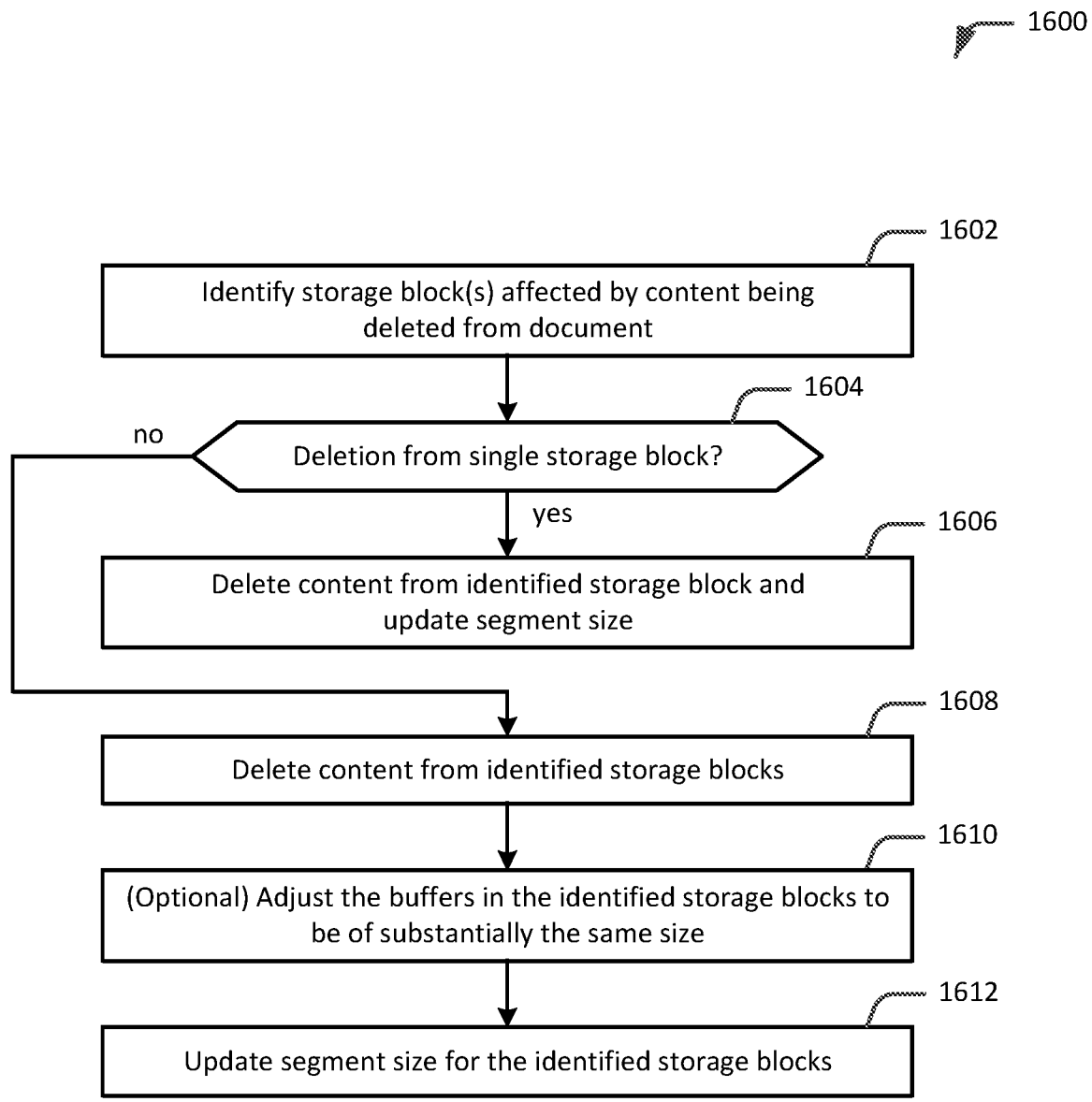
FIG. 16 is a flow diagram of an illustrative process for deletion of content from a stored document, in accordance with an embodiment of the present disclosure.

FIG. 16 is a flow diagram of an illustrative process 1600 for deletion of content from a stored document, in accordance with an embodiment of the present disclosure. At operation 1602, the database service may identify the storage block(s) affected by the deletion of content. For example, as described previously, the database service can compare the document being saved and the currently stored copy of the document to identify the differences. Then, for each identified difference (deletion of content), the database service can identify the storage block that is affected by the deletion of content. At operation 1604, the database service may determine whether the deletion of content is from a single storage block. Here, the database service is determining whether the deletion of content is from a single content segment stored in a single storage block or from multiple content segments stored in corresponding multiple storage blocks (e.g., a storage block and its neighboring storage block). If the database service determines that the deletion of content is from a single storage block, then, at operation 1606, the database service may delete the content from the content segment being stored in the identified storage block (storage block identified at operation 1602). The database service may then update the segment size value in the metadata record for the document to reflect the decrease in size of the content segment being stored in the identified storage block.

Otherwise, if the database service determines that the deletion of content is not from a single storage block, then, at operation 1608, the database service may delete the content from the identified storage blocks (storage blocks identified at operation 1602). At operation 1610, the database service may optionally adjust the buffers in the identified storage blocks (e.g., the buffers remaining in the identified storage blocks from which content is deleted) to be of the same size or substantially the same size. At operation 1612, the database service may update the segment size values in the metadata record for the document to reflect the sizes of the respective content segments stored in the identified storage blocks.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
   segmenting, by a computing device, content of a document into a plurality of content segments;
   storing, by the computing device, the plurality of content segments within a data structure, the data structure including storage blocks, in which individual storage blocks include a storage portion and a buffer portion, and the storage of the plurality of content segments including storage of individual content segments within the storage portion of the storage blocks of the data structure and not the buffer portion of the storage blocks of the data structure such that sizes of the buffer portions remain same or increase after storage of the individual content segments within the storage portion of the storage blocks;
   receiving, by the computing device, at least one change to the content; and
   utilizing, by the computing device, a buffer portion of at least one storage block to store the at least one change to the content.

2. The method of claim 1, wherein the storage block is a first storage block, the method further comprising:
   receiving, by the computing device, a second change to the content; and
   utilizing, by the computing device, the buffer portion of the first storage block and a buffer portion of a second neighboring storage block of the data structure to store the second change to the content.

3. The method of claim 2, further comprising adjusting the buffer portion in the first storage block and the buffer portion in the second, neighboring storage block of the data structure to be the same size.

4. The method of claim 1, wherein the storage block is a first storage block, the method further comprising:
receiving, by the computing device, a second change to the content;
generating, by the computing device, a new storage block in the data structure, the new storage block including a storage portion and a buffer portion, the new storage block neighboring the first storage block; and
utilizing, by the computing device, the buffer portion of the first storage block and the storage portion and the buffer portion of the new storage block of the data structure to store the second change to the content.

5. The method of claim 4, further comprising adjusting the buffer portion in the first storage block and the buffer portion in the new storage block of the data structure to be the same size.

6. The method of claim 1, wherein the buffer portion is at least 20% of the storage block.

7. The method of claim 1, wherein the at least one change to the content comprises deleting content from a content segment of the plurality of content segments stored in a content portion of at least one storage block such that a buffer portion of the at least one storage block is increased in size.

8. A system comprising:
a memory; and
one or more processors in communication with the memory and configured to,
segment content of a document into a plurality of content segments;
store the plurality of content segments within a data structure, the data structure including storage blocks, in which individual storage blocks include a storage portion and a buffer portion, and the storage of the plurality of content segments including storage of individual content segments within the storage portion of the storage blocks of the data structure and not the buffer portion of the storage blocks of the data structure such that sizes of the buffer portions remain same or increase after storage of the individual content segments within the storage portion of the of the storage blocks; and
responsive to at least one change to the content of the document, store the at least one change to the content utilizing a buffer portion of at least one storage block.

9. The system of claim 8, wherein the storage block is a first storage block, and the one or more processors in communication with the memory further configured to:
responsive to a second change to the content of the document, store the second change to the content utilizing the buffer portion of the first storage block and a buffer portion of a second neighboring storage block of the data structure.

10. The system of claim 9, wherein the one or more processors in communication with the memory is further configured to adjust the buffer portion in the first storage block and the buffer portion in the second, neighboring storage block of the data structure to be the same size.

11. The system of claim 8, wherein the storage block is a first storage block, and the one or more processors in communication with the memory further configured to:
responsive to a second change to the content of the document,
generate a new storage block in the data structure, the new storage block including a storage portion and a buffer portion, the new storage block neighboring the first storage block; and
store the second change to the content utilizing the buffer portion of the first storage block and the storage portion and the buffer portion of the new storage block of the data structure.

12. The system of claim 11, wherein the one or more processors in communication with the memory is further configured to adjust the buffer portion in the first storage block and the buffer portion in the new storage block of the data structure to be of substantially the same size.

13. The system of claim 11, wherein the buffer portion is at least 20% of the storage block.

14. The system of claim 7, wherein the at least one change to the content comprises a deletion of content, and the one or more processors in communication with the memory further configured to:
delete content from a content segment of the plurality of content segments stored in a content portion of at least one storage block such that a buffer portion of the at least one storage block is increased in size.

15. A non-transitory machine-readable medium encoding instructions that when executed by one or more processors cause a process to be carried out, the process comprising:
segmenting content of a document into a plurality of content segments;
storing the plurality of content segments within a data structure, the data structure including storage blocks, in which individual storage blocks include a storage portion and a buffer portion, and the storage of the plurality of content segments including storage of individual content segments within the storage portion of the storage blocks of the data structure and not the buffer portion of the storage blocks of the data structure such that sizes of the buffer portions remain same or increase after storage of the individual content segments within the storage portion of the of the storage blocks; and
responsive to at least one change to the content, utilizing a buffer portion of at least one storage block to accommodate the at least one change to the content.

16. The non-transitory machine-readable medium of claim 15, wherein the storage block is a first storage block, the process further comprising:
responsive to a second change to the content, utilizing the buffer portion of the first storage block and a buffer portion of a second neighboring storage block of the data structure to accommodate the second change to the content.

17. The non-transitory machine-readable medium of claim 16, the process further comprising adjusting the buffer portion in the first storage block and the buffer portion in the second, neighboring storage block of the data structure to be the same size.

18. The non-transitory machine-readable medium of claim 15, wherein the storage block is a first storage block, the process further comprising:
- responsive to a second change to the content,
- generating a new storage block in the data structure, the new storage block including a storage portion and a buffer portion, the new storage block neighboring the first storage block; and
- utilizing the buffer portion of the first storage block and the storage portion and the buffer portion of the new storage block of the data structure to accommodate the second change to the content.

19. The non-transitory machine-readable medium of claim 18, the process further comprising adjusting the buffer portion in the first storage block and the buffer portion in the new storage block of the data structure to be the same size.

20. The non-transitory machine-readable medium of claim 15, wherein the at least one change to the content comprises deleting content from a content segment of the plurality of content segments stored in a content portion of at least one storage block such that a buffer portion of the at least one storage block is increased in size.

\* \* \* \* \*